US010036559B2

(12) United States Patent
Szekely

(10) Patent No.: US 10,036,559 B2
(45) Date of Patent: Jul. 31, 2018

(54) HEATABLE PATHWAY SYSTEM FOR TRAFFIC

(71) Applicant: ASTRA CAPITAL INCORPORATED, Mississauga (CA)

(72) Inventor: Kenneth Szekely, Oakville (CA)

(73) Assignee: ASTRA CAPITAL INCORPORATED, Mississauga (CA)

( * ) Notice: Subject to any disclaimer, the term of this patent is extended or adjusted under 35 U.S.C. 154(b) by 0 days.

(21) Appl. No.: 14/955,233

(22) Filed: Dec. 1, 2015

(65) Prior Publication Data

US 2016/0153669 A1 Jun. 2, 2016

Related U.S. Application Data

(60) Provisional application No. 62/086,707, filed on Dec. 2, 2014.

(51) Int. Cl.
| | |
|---|---|
| *H05B 3/00* | (2006.01) |
| *H05B 3/02* | (2006.01) |
| *F24D 13/02* | (2006.01) |
| *E01C 5/00* | (2006.01) |
| *E01C 15/00* | (2006.01) |
| *E01C 11/00* | (2006.01) |

(Continued)

(52) U.S. Cl.
CPC ............... *F24D 13/02* (2013.01); *E01C 5/00* (2013.01); *E01C 5/005* (2013.01); *E01C 11/00* (2013.01); *E01C 15/00* (2013.01); *H05B 3/26* (2013.01); *H05B 3/28* (2013.01); *H05B 2203/026* (2013.01); *Y02B 30/26* (2013.01)

(58) Field of Classification Search
CPC . H05B 3/20–3/26; H05B 3/267; H05B 3/286; H05B 3/28; H05B 2203/026; H02J 1001/106; F24D 13/02; E01C 5/00; E01C 11/00; Y02B 30/26
USPC .......................... 219/480–486, 507–508, 213
See application file for complete search history.

(56) References Cited

U.S. PATENT DOCUMENTS

| | | | | |
|---|---|---|---|---|
| 2,912,555 A | * | 11/1959 | Jamison | F24D 13/022 219/213 |
| 3,236,991 A | * | 2/1966 | Graham | E01C 11/265 219/213 |

(Continued)

*Primary Examiner* — Sang Y Paik
(74) *Attorney, Agent, or Firm* — Hodgson Russ LLP

(57) ABSTRACT

A heatable pathway system for traffic comprises a first module having a first electrically powerable heater member and a second module having a second electrically powerable heater member. The first module and the second module are each installable in place to form a heatable pathway system for traffic. An electrical power controller circuit has a first power output connected in power supplying relation to the first electrically powered heater member and a second power output connected in power supplying relation to the second electrically powerable heater member. The electrical power controller circuit is operable to provide electrical power from the power outputs in a heating cycle that comprises a first heating sub-cycle and a second heating sub-cycle such that, during a heating cycle, a first one of the electrically powerable heater members is on and a second one of the electrically powerable heater members is off during the first heating sub-cycle, and the second electrically powerable heater member is on and the first electrically powerable heater members is off during the second heating sub-cycle.

22 Claims, 19 Drawing Sheets

(51) Int. Cl.
   *H05B 3/28*      (2006.01)
   *H05B 3/26*      (2006.01)

(56) References Cited

U.S. PATENT DOCUMENTS

| | | | | |
|---|---|---|---|---|
| 3,454,746 | A | * | 7/1969 | Dubois ................. E01C 11/265 |
| | | | | 219/213 |
| 4,310,745 | A | * | 1/1982 | Bender .................... H05B 3/10 |
| | | | | 219/213 |
| 4,447,712 | A | * | 5/1984 | Covillion ........... G05D 23/1924 |
| | | | | 219/486 |
| 4,829,159 | A | * | 5/1989 | Braun ................ G05D 23/1913 |
| | | | | 219/483 |
| 6,188,839 | B1 | * | 2/2001 | Pennella ................. F24D 13/02 |
| | | | | 392/435 |

* cited by examiner

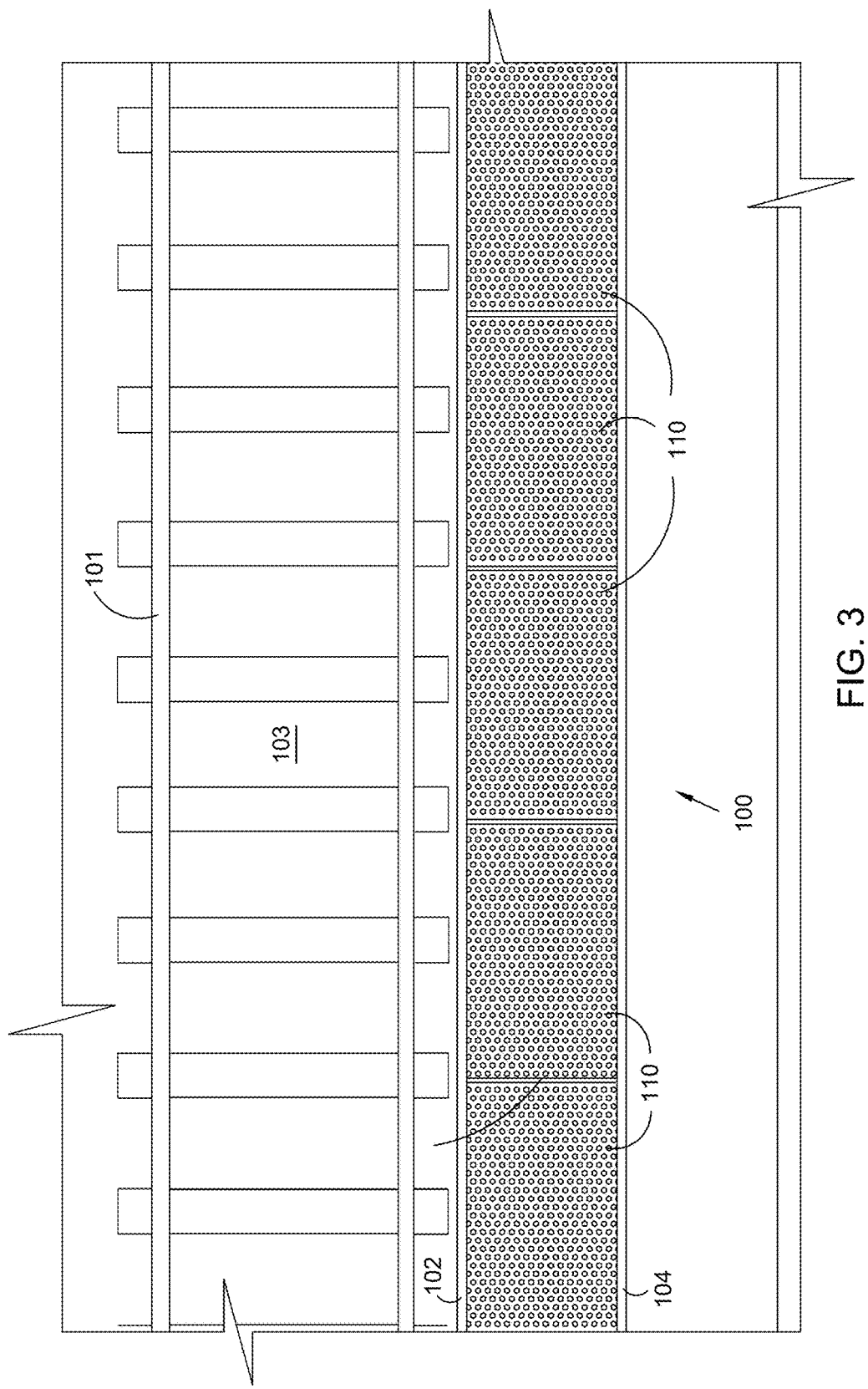

HEATABLE PATHWAY SYSTEM FOR TRAFFIC

RELATED APPLICATIONS

This application is a non-provisional application claiming priority from U.S. Provisional Patent Application Ser. No. 62/086,707 filed on Dec. 2, 2014, which is herein incorporated by reference.

FIELD OF THE INVENTION

The present invention relates to heatable pathway systems for traffic such as pedestrian walkways and driveways for vehicles, and more particularly to heatable pathway systems for traffic, wherein the heatable pathway systems are efficient in its use of energy, and wherein the heatable modules used therein can include detectable warning indicators at the top surface thereof.

BACKGROUND OF THE INVENTION

In areas where there is pedestrian and vehicular traffic, particularly in publically accessible areas, it is universally common to have specific pathways, such as walkways for pedestrians and driveways for vehicles.

Such walkways might include sidewalks, pedestrian bridges, paved walkways through parks, patios, floor surfaces, and the like. Further, such pedestrian walkways exist in public transit facilities, such as subway stations, light rapid transit, bus rapid transit, railway stations, and the like, where there is very significant amount of pedestrian traffic. In many types of pedestrian walkways, there is a requirement for pedestrians to be able to safely navigate such walkways and to remain on the walkways, especially where public transit vehicles are passing closely by. This is particularly important for mass transit platforms in public transit facilities, where there is presently the most significant need for safe pedestrian walkways, such as mass transit platforms and the like.

More specifically, there is a need for pedestrians to be able to maintain good traction on pedestrian walkways in order to prevent slips and falls, particularly on outdoor surfaces that can be subject to inclement weather such as wind, rain and snow, and on outdoor surfaces that retain snow and ice.

Additionally, in some places such as public transit facilities, driveways and the like for vehicles, particularly service vehicles, there is a need to be able to maintain good traction for vehicles during inclement weather and on outdoor surfaces that retain snow and ice.

Additionally, it is important for pedestrians to be able to determine the nearby presence of platform edges so that the pedestrians do not accidentally walk off the edge of a platform, where a vehicle, such as a public transit vehicle, or even a private vehicle, might be passing by. This is especially important in mass transit situations, and particularly for commuter trains, where the side of the train is right at the edge of the platform. The need for making the nearby presence of platform edges easy to determine, especially by blind or visually impaired persons, is of course is of particularly acute importance in attempting to make such facilities accessible and safe for blind or visually impaired persons.

Various types of transit boarding platform panels exist that include detectable warning tiles at the top thereof in order to permit persons, especially blind or visually impaired persons, to detect the nearby presence of platform edges. One such state-of-the art transit boarding platform panels is taught in the present inventor's earlier U.S. Pat. No. 7,690,862, issued Apr. 6, 2010 to Szekely, and entitled Quick Connect Transit Boarding Platform Panel. The transit boarding platform panel is for use along an edge of a transit platform adjacent a track. The panel comprises a molded base portion formed from a reinforced composite polymer. The base portion has a top deck and bottom plate, a first side and an opposite second side, a first end and an opposite second end. The first side is intended to be adjacent a track at an edge of the transit boarding platform. The second side is intended to be adjacent the transit platform. A series of internal support members are disposed between the top deck and bottom plate. In one embodiment, the top deck has a detectable warning surface consisting of raised truncated domes detectable by the visually impaired in accordance with Americans with Disabilities Act (ADA): Accessibility Guidelines for Buildings and Facilities. The first and second ends are provided with means to interconnect adjacent panels and to secure the panels to the platform. In one embodiment, the means to interconnect adjacent panels and to secure the panels to the platform includes a groove provided on the first end of each panel and a tongue provided on the second end of each panel. The groove is sized and shaped to accept a corresponding sized and shaped tongue provided on the second end of an adjacent panel. The tongue is hollow and has a bolt hole at either end. A threaded securing rod is inserted through a hole in the timber headers that form the retaining wall for the platform, and then is inserted through the tongue via the bolt holes.

This transit boarding platform panel is installed by 1) Setting a sub-base of engineered granular fill (crushed stone); 2) Laying out timber retaining wall and stake in platform, 3) Filling in retaining wall area with compacted granular fill; and 4) Installing structural plastic transit platform.

While it has been found that this transit boarding platform panel works very well, it has also been found that there is a need for heatable modules, such as modular panels, modular tiles, and the like, for constructing pathways, such as pedestrian walkways and vehicular driveways, including mass transit platforms, wherein the top surface is readily removable and replaceable and wherein the heater is removable and replaceable. It has further been found that there is a need for heatable modules, such as modular panels, modular tiles, and the like, for constructing pathways, such as pedestrian walkways and vehicular driveways, including mass transit platforms, that are easy to install and cost effective to install. It has further been found that there is a need for heatable modules, such as modular panels, modular tiles, and the like, for constructing pathways, such as pedestrian walkways and vehicular driveways, including mass transit platforms, that are cost effective to heat.

It has further been found that there is a need for heatable modules, such as heatable modular panels, heatable modular tiles, and the like, for constructing pathways, such as pedestrian walkways and vehicular driveways, including mass transit platforms, wherein the heatable modules are more readily manufactured and more cost effectively manufactured than prior art and heatable modular panels, heatable modular tiles, and the like.

It has further been found that there is a need for modules, such as modular panels, modular tiles, and the like, and heatable modules, such as modular panels, modular tiles, and the like, for constructing pathways, such as pedestrian walkways and vehicular driveways, including mass transit platforms, that are water resistant, especially where heated modular panels are used.

It is also known to heat the floors of residential and commercial buildings. Such known prior art heated floors are expensive to install and operate. There is a need to reduce these types of expenses.

U.S. Pat. No. 7,578,102, issued Aug. 25, 2009 to Banister, and entitled Electric Tile Modules, discloses an electrically connectable tile module that includes a porous substrate having a top side, a bottom side, and at least two side edges. At least one connector is integrated into the porous substrate allowing adjoining electrically connectable tile modules to be electrically connected to the porous substrate. At least one electrical element is disposed over the top side of the porous substrate and electrically connected to the at least one connector. Thermo-voltaic elements and photovoltaic elements are housed within the disclosed tile module for generating electricity from heat and light, respectively. There is no teaching of efficiently distributing the electrical power to the various electrical elements.

U.S. Published Patent Application No. 2014/0157691, published Jun. 12, 2014 to Putnam, and entitled Patio, Porch Or Walkway Assembly Incorporating A Plurality Of Blocks And Including Any Combination Of Pre-Cast And Exposed Surfaced Patterns, Interiorly Supported Heating Pads And Led Effect Lighting, discloses an assembly for creating a three dimensional exterior structure incorporates a plurality of bodies inter-assembled via engaging tongue and groove profiles to create at least one of a multi-tier stepped or extending walkway surface. Each of the bodies further exhibits a hollowed interior to facilitate in-filling of a compactible material in order to weight said bodies during assembly. Thermal generating elements can be incorporated into one or more of the bodies. In one embodiment, the thermal generating elements include heating pads or inserts connected to a remote power supply through a connecting network that includes a junction box and wiring associated with the second assembled layer. There is no teaching of efficiently distributing the electrical power to the various heating pads or inserts.

It is an object of the present invention to provide heatable pathway systems, such as pedestrian walkways and vehicular driveways.

It is an object of the present invention to provide heatable pathway systems, such as pedestrian walkways and vehicular driveways, particularly a transit platform or the like.

It is an object of the present invention to provide heatable pathway systems, such as pedestrian walkways and vehicular driveways, that use electrical power efficiently.

It is an object of the present invention to provide heatable pathway systems, such as pedestrian walkways and vehicular driveways, that are modular.

It is another object of the present invention to provide heatable pathway systems, such as pedestrian walkways and vehicular driveways, wherein the heatable modules that are used to construct the heatable pathway systems readily fit properly in place adjacent a wood header of an adjoining platform subgrade that accommodates heatable modules that are about three inches in height.

It is another object of the present invention to provide heatable pathway systems, such as pedestrian walkways and vehicular driveways, wherein the heatable modules used can include top plates.

It is another object of the present invention to provide heatable pathway systems, such as pedestrian walkways and vehicular driveways, that can include detectable warning indicators.

It is another object of the present invention to provide heatable pathway systems, such as pedestrian walkways and vehicular driveways, that can include detectable warning tiles.

It is another object of the present invention to provide heatable pathway systems, such as pedestrian walkways and vehicular driveways, that can include a textured top surface.

It is a further object of the present invention to provide heatable pathway systems, such as pedestrian walkways and vehicular driveways, wherein the included heatable modules are readily connectable one to the next.

It is a further object of the present invention to provide heatable pathway systems, such as pedestrian walkways and vehicular driveways, wherein the included heatable modules are lightweight.

It is a further object of the present invention to provide heatable pathway systems, such as pedestrian walkways and vehicular driveways, wherein the heatable modules are easy to manufacture.

It is a further object of the present invention to provide heatable pathway systems, such as pedestrian walkways and vehicular driveways, wherein the base member of the heatable modules are water resistant.

It is a further object of the present invention to provide heatable pathway systems, such as pedestrian walkways and vehicular driveways, wherein the amount of material used to form the heatable modules that are used is significantly less than in prior art heatable modules.

It is a further object of the present invention to provide heatable pathway systems, such as pedestrian walkways and vehicular driveways, wherein the amount of material used to form the internal support members of the heatable modules that are used is significantly less than in prior art heatable modules.

It is a further object of the present invention to provide heatable pathway systems, such as pedestrian walkways and vehicular driveways, wherein the heatable modules that are used are easier to manufacture than are prior art heatable modules.

It is a further object of the present invention to provide heatable pathway systems, such as pedestrian walkways and vehicular driveways, wherein the heatable modules that are used are quicker to manufacture than are prior art heatable modules It is a further object of the present invention to provide heatable pathway systems, such as pedestrian walkways and vehicular driveways, wherein the base member of the heatable modules that are used is made via a compression molding process or method, such as sheet molded compound (SMC) or wet compression molding.

It is a further object of the present invention to provide heatable pathway systems, such as pedestrian walkways and vehicular driveways, wherein the base member of the heatable modules that are used has favourable dielectric properties.

It is a further object of the present invention to provide heatable pathway systems, such as pedestrian walkways and vehicular driveways, wherein heat is transmitted quickly through the top plate above the base member of the heatable modules that are used.

It is a further object of the present invention to provide heatable pathway systems, such as pedestrian walkways and vehicular driveways, wherein the amount of material used to form the heatable modules that are used is significantly less than in prior art heatable modules.

It is a further object of the present invention to provide heatable pathway systems, such as pedestrian walkways and vehicular driveways, that is energy efficient.

It is a further object of the present invention to provide heatable pathway systems, such as pedestrian walkways and vehicular driveways, wherein the heatable modules that are used are energy efficient.

It is a further object of the present invention to provide heatable pathway systems, such as pedestrian walkways and vehicular driveways, wherein the heatable modules that are used contain a thin electrically powerable heater member.

It is a further object of the present invention to provide heatable pathway systems, such as pedestrian walkways and vehicular driveways, wherein heat is transmitted quickly through the top plate above the base member of the heated modules used therein.

SUMMARY OF THE INVENTION

In accordance with one aspect of the present invention there is disclosed a novel heatable pathway system for traffic comprising a first module having a first electrically powerable heater member and a second module having a second electrically powerable heater member. The first module and the second module are each installable in place to form a pathway for traffic. An electrical power controller circuit has a first power output connected in power supplying relation to the first electrically powered heater member and a second power output connected in power supplying relation to the second electrically powerable heater member. The electrical power controller circuit is operable to provide electrical power from the power outputs in a heating cycle that comprises a first heating sub-cycle and a second heating sub-cycle such that, during a heating cycle, a first one of the electrically powerable heater members is on and a second one of the electrically powerable heater members is off during the first heating sub-cycle, and the second electrically powerable heater member is on and the first electrically powerable heater members is off during the second heating sub-cycle.

In accordance with another aspect of the present invention there is disclosed a novel method of heating a pathway for traffic having a first module with a first electrically powerable heater member, and a second module with a second electrically powerable heater member. The method comprises the steps of connecting a first power output of an electrical power controller circuit in power supplying relation to the first electrically powerable heater member, and connecting a second power output of an electrical power controller circuit in power supplying relation to the second electrically powerable heater member; and operating the electrical power controller circuit to provide electrical power from the first and second power outputs in a heating cycle that comprises a first heating sub-cycle and a second heating sub-cycle such that, during a heating cycle, a first one of the electrically powerable heater members is on and a second one of the electrically powerable heater members is off during the first heating sub-cycle, and the second electrically powerable heater member is on and the first electrically powerable heater members is off during the second heating sub-cycle.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described herein below.

BRIEF DESCRIPTION OF THE DRAWINGS

The novel features which are believed to be characteristic of the heatable pathway system for traffic according to the present invention, as to its structure, organization, use and method of operation, together with further objectives and advantages thereof, will be better understood from the following drawings in which a presently known embodiment of the invention will now be illustrated by way of example. It is expressly understood, however, that the drawings are for the purpose of illustration and description only, and are not intended as a definition of the limits of the invention. In the accompanying drawings:

FIG. 3 is a top plan view of the first illustrated embodiment transit platform of FIG. 1;

DETAILED DESCRIPTION OF THE ILLUSTRATED EMBODIMENTS

Figure 15:
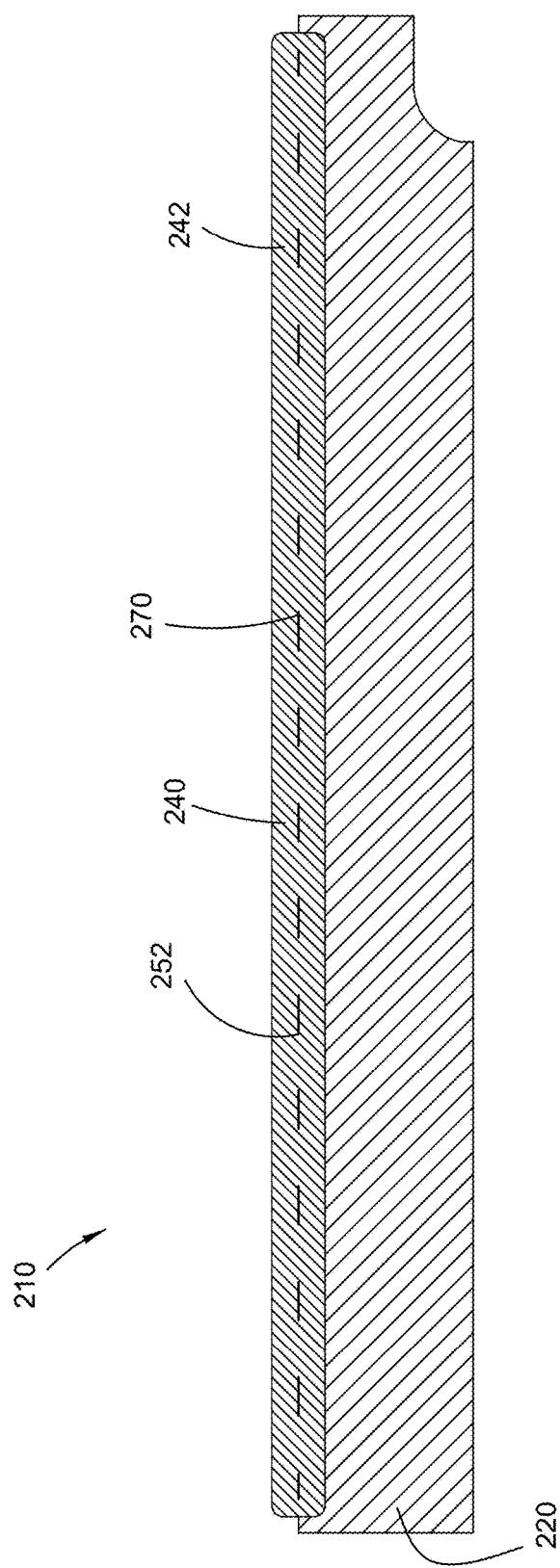
FIG. 15 is an enlarged cross-sectional side elevational view of a second illustrated embodiment heatable module according to the present invention, showing that the mesh heater member is integrally formed into the top plate; and, FIG. 16 is an enlarged cross-sectional side elevational view of a third illustrated embodiment heatable module according to the present invention, showing that the mesh heater member is integrally formed into the top deck of the bottom member.
Figure 16:
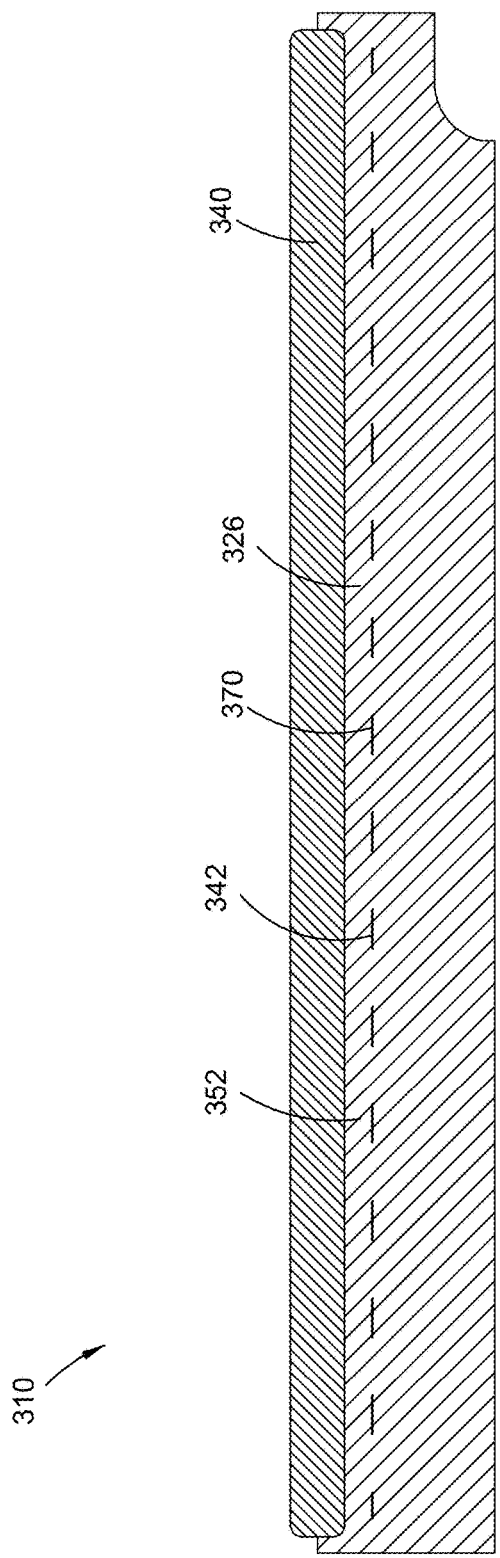
Figure 17:
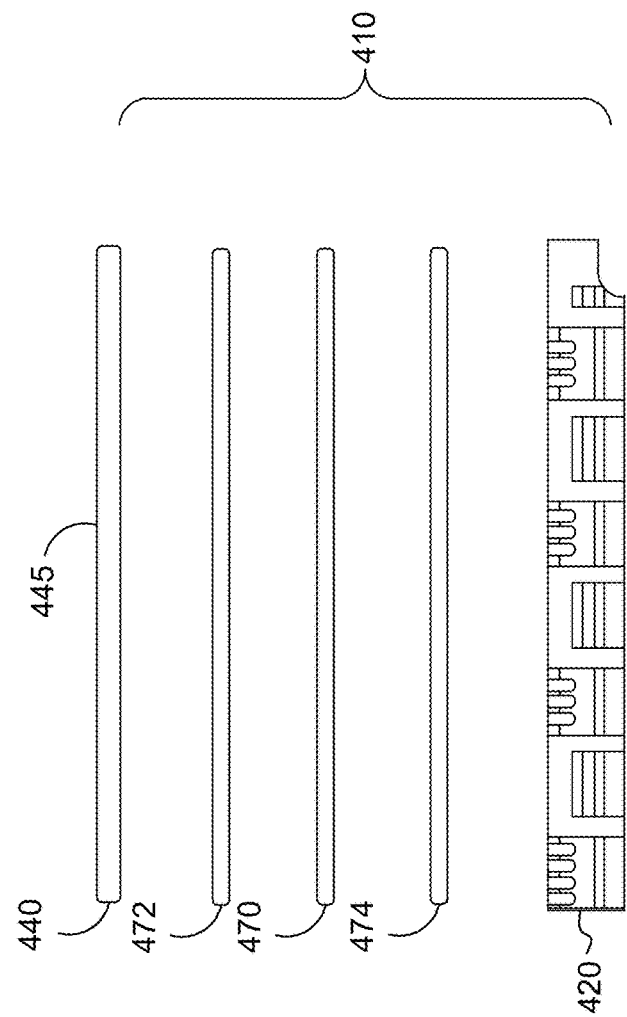
FIG. 17 is an end elevational view of a fourth illustrated embodiment heatable module according to the present invention, showing a heat control layer and a heat reflective layer; and, FIG. 18 is an end elevational view of a fifth illustrated embodiment heatable module according to the present invention, showing disposed between the various internal cross support members and the walls.
Figure 18:
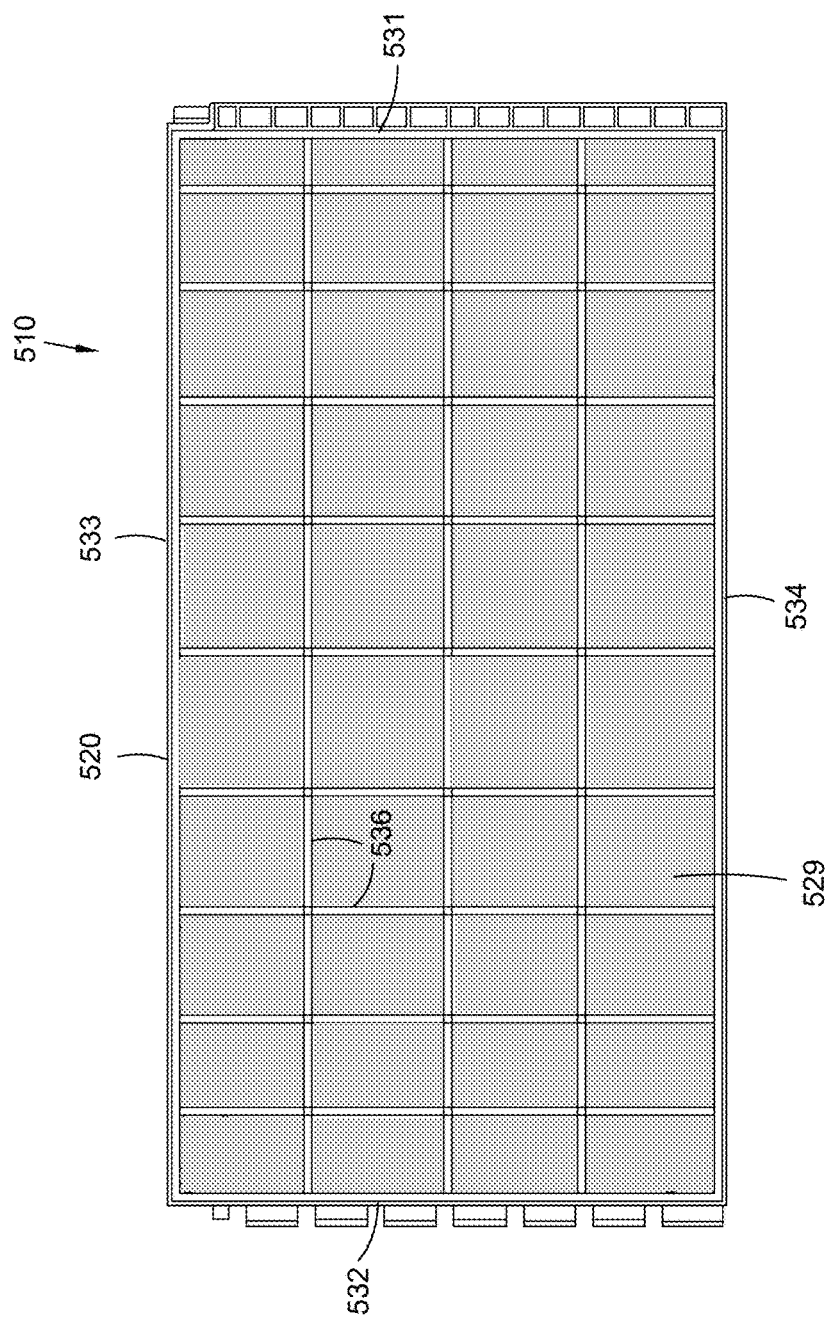

Referring to FIGS. 1 through 18 of the drawings, it will be noted that FIGS. 1 through 14 show a first illustrated embodiment of the heatable pathway system for traffic according to the present invention, FIG. 15 illustrates a second illustrated embodiment of the heatable pathway system for traffic according to the present invention, FIG. 16 illustrates a third illustrated embodiment of the heatable pathway system for traffic according to the present invention, FIG. 17 illustrates a fourth illustrated embodiment of the heatable pathway system for traffic according to the present invention, and FIG. 18 illustrates a fifth illustrated embodiment of the heatable pathway system for traffic according to the present invention.

Reference will now be made to FIGS. 1 through 13, which show the first illustrated embodiment of the heatable pathway system for traffic according to the present invention, as indicated by the general reference numeral 100. The first illustrated embodiment heatable pathway system for traffic according to the present invention comprises a plurality of heatable modules, as indicated by the general reference numeral 110. The modules 110 are for use in constructing the heatable pathway system for traffic, such as the transit platform 100, adjacent a railroad track 101, as illustrated.

It should be noted that the heatable module might be any one or more of a heatable panel, a heatable tile, a heatable platform, a heatable platform portion, a heatable deck, a heatable deck portion, a heatable plate, a heatable block, a heatable board, a heatable slat, heatable flooring, a heatable brick, a heatable slab, and the like.

As illustrated, the heatable pathway system 100 comprises, in brief, a first heatable module 110a having a first electrically powerable heater member 170a, a second heatable module 110b having a second electrically powerable heater member 170b, a third heatable module 110c having a third electrically powerable heater member 170c, a fourth heatable module 110d having a fourth electrically powerable heater member 170d, a fifth heatable module 110e having a fifth electrically powerable heater member 170e, and an electrical power controller circuit 190. The heatable modules 110a-110e are for use in constructing a heatable pathway system for traffic 100, specifically a heatable pedestrian walkway for traffic, such as the heatable transit platform 100.

More specifically, the first illustrated embodiment heatable module 110 comprises a heatable modular panel 110 that is rectangular in shape, and is typically greater than one meter in length and less than one meter in width, and perhaps about 7.5 centimeters (3 inches) in height. It has been found that this size and shape is suitable for the intended applications. It should be understood that the heatable modular panel 110 can be of any suitable shape and size.

Figure 1:
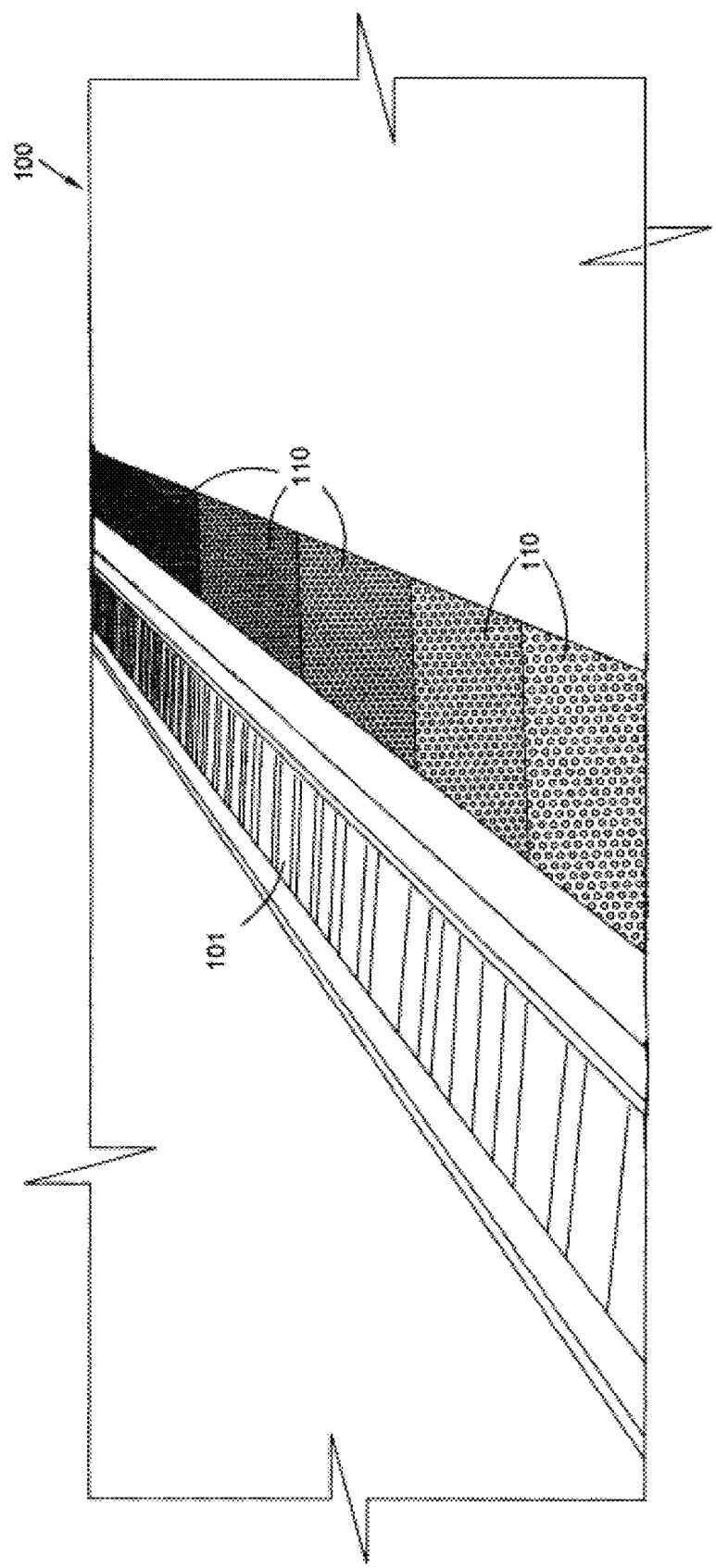
FIG. 1 is a perspective view of a plurality of the first illustrated embodiment heatable modules installed in place to form a first illustrated embodiment heatable pathway system, specifically a transit platform, according to the present invention.
Figure 2:
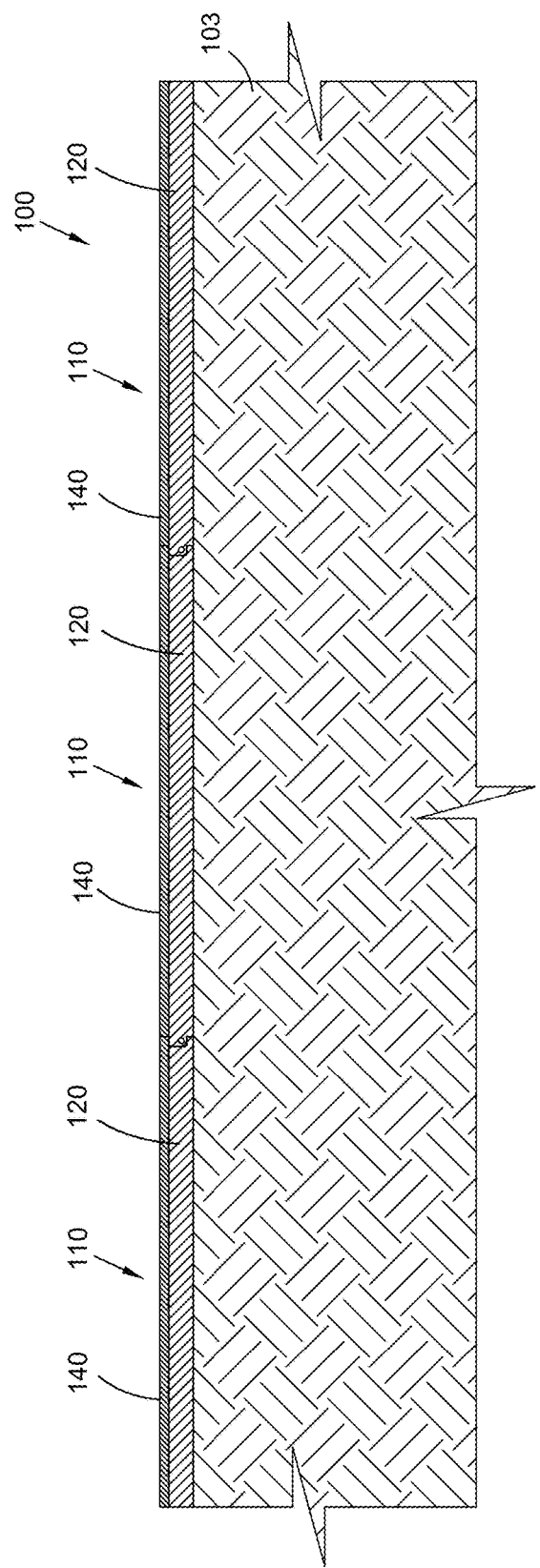
FIG. 2 is a cross-sectional side elevational view of the first illustrated embodiment transit platform of FIG. 1.
Figure 3A:
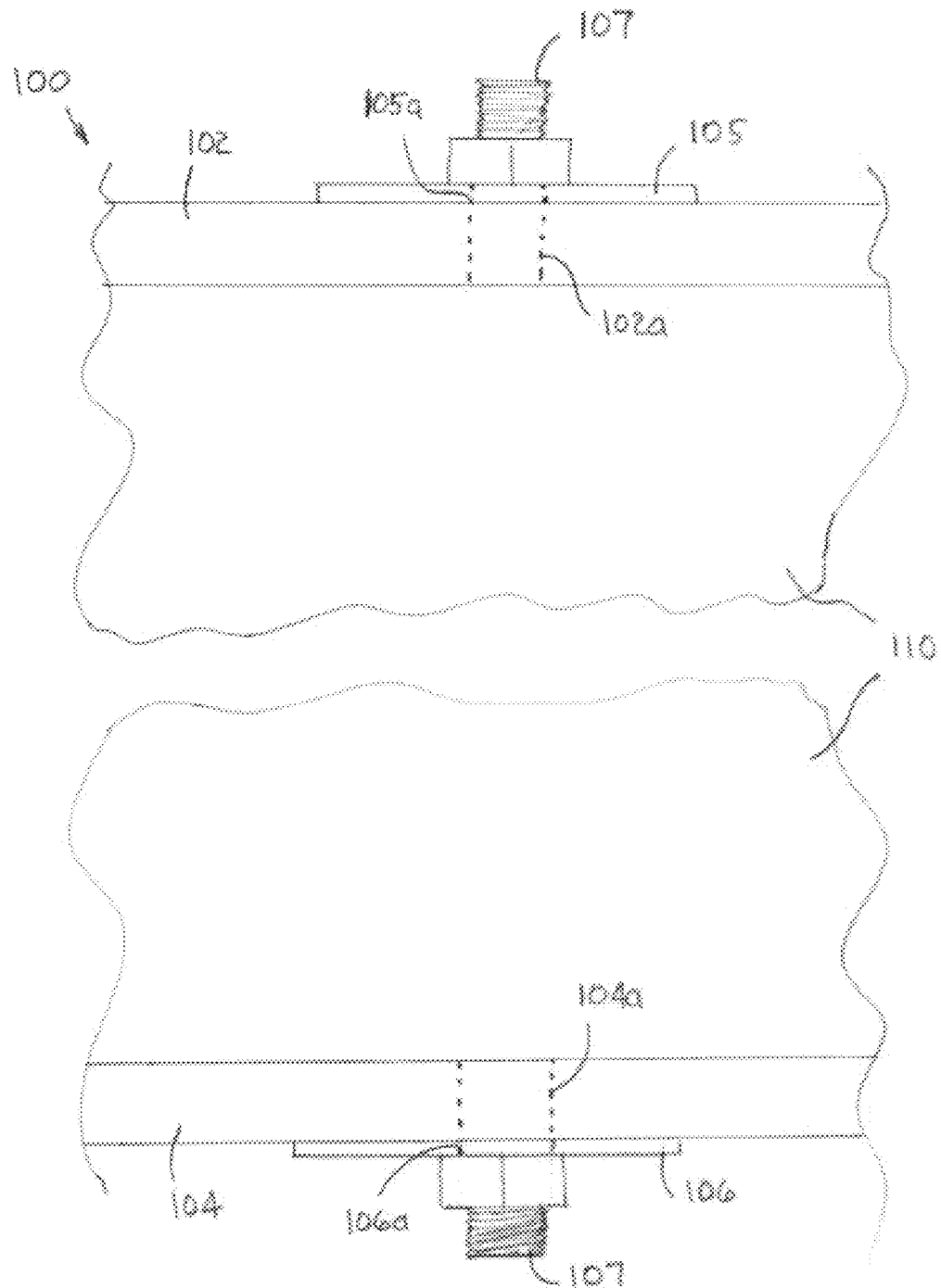
FIG. 3A is an enlarged top plan view of a portion of the transit platform of FIG. 1.
Figure 4:
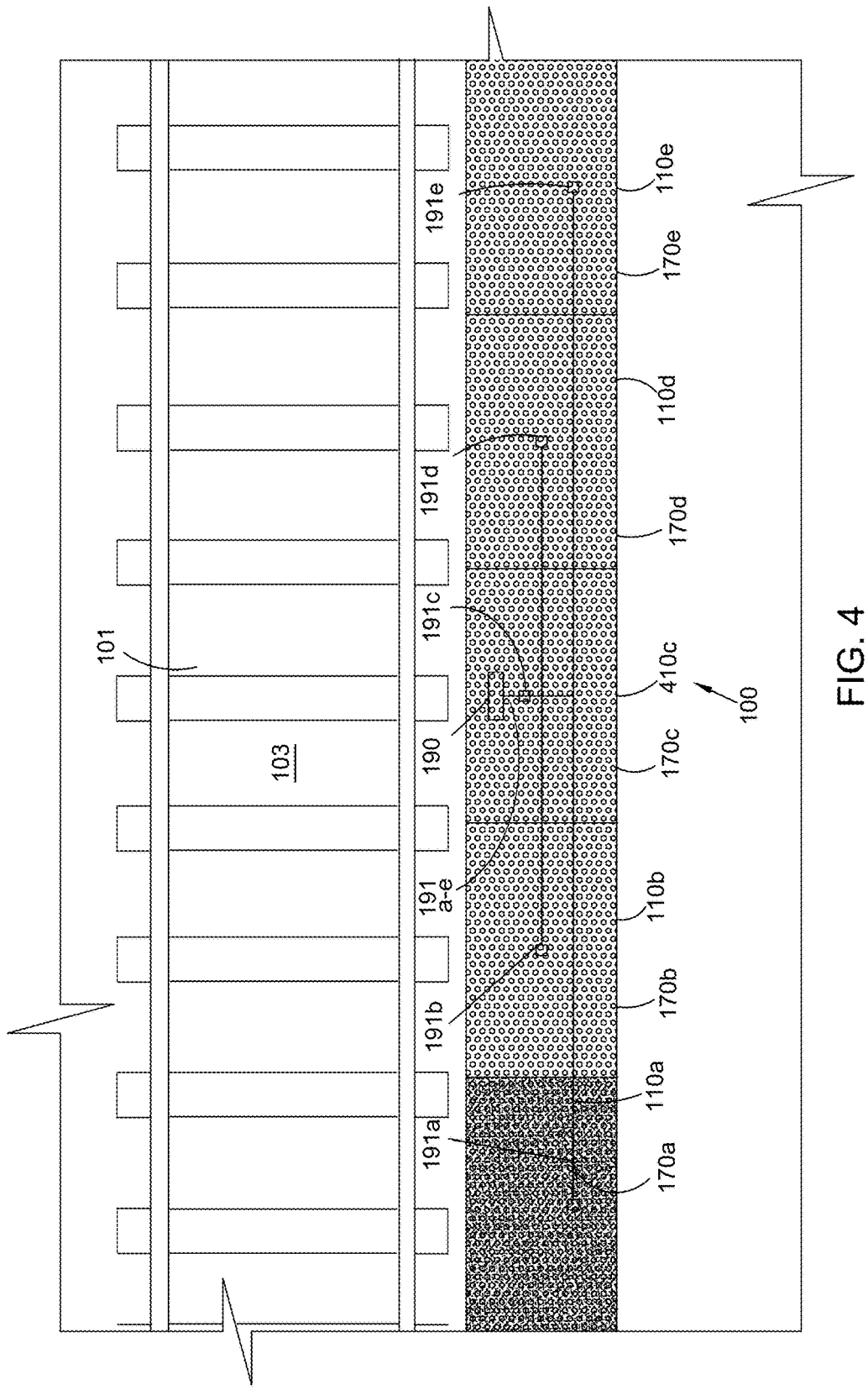
FIG. 4 is a top plan view of the transit platform of FIG. 1, showing the first illustrated embodiment heatable modules in a first section of the first illustrated embodiment transit platform being heated during a first heating sub-cycle of an overall heating cycle.
Figure 5:
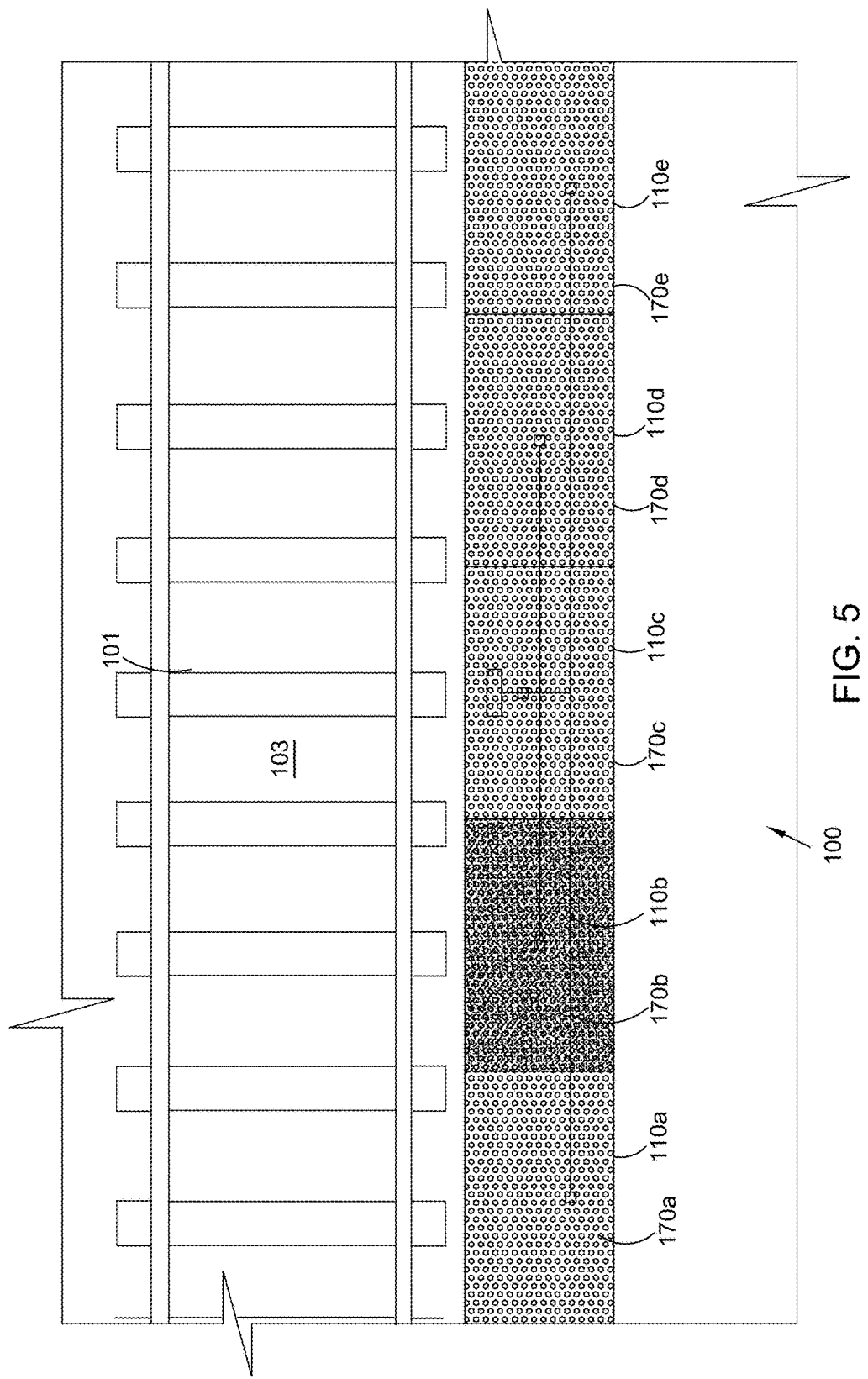
FIG. 5 is a top plan view of the transit platform of FIG. 1, showing the first illustrated embodiment heatable modules in a second section of the first illustrated embodiment transit platform being heated during a second heating sub-cycle of an overall heating cycle.
Figure 6:
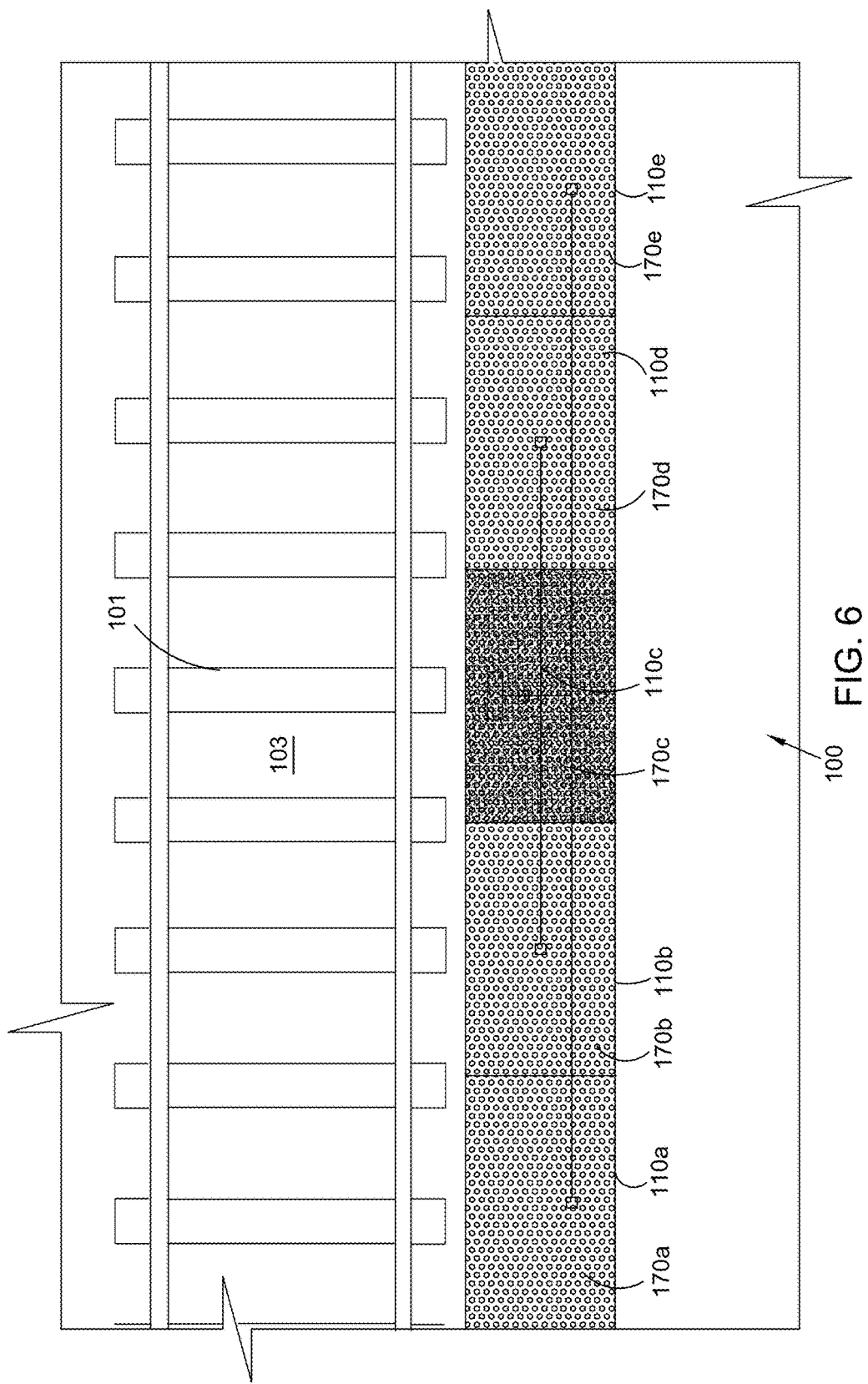
FIG. 6 is a top plan view of the transit platform of FIG. 1, showing the first illustrated embodiment heatable modules in a third section of the first illustrated embodiment transit platform being heated during a third heating sub-cycle of an overall heating cycle.
Figure 7:
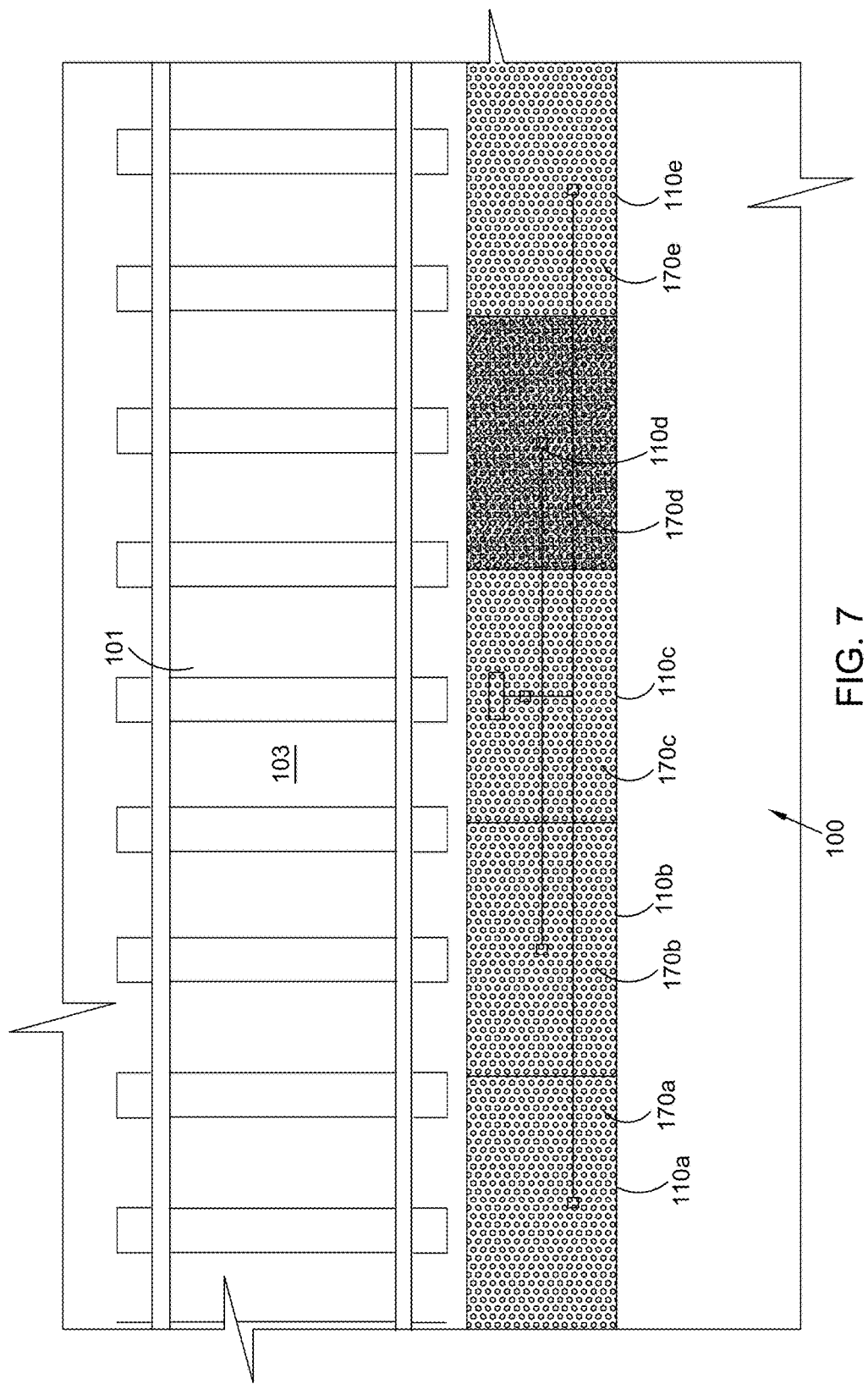
FIG. 7 is a top plan view of the transit platform of FIG. 1, showing the first illustrated embodiment heatable modules in a fourth section of the first illustrated embodiment transit platform being heated during a fourth heating sub-cycle of an overall heating cycle.
Figure 8:
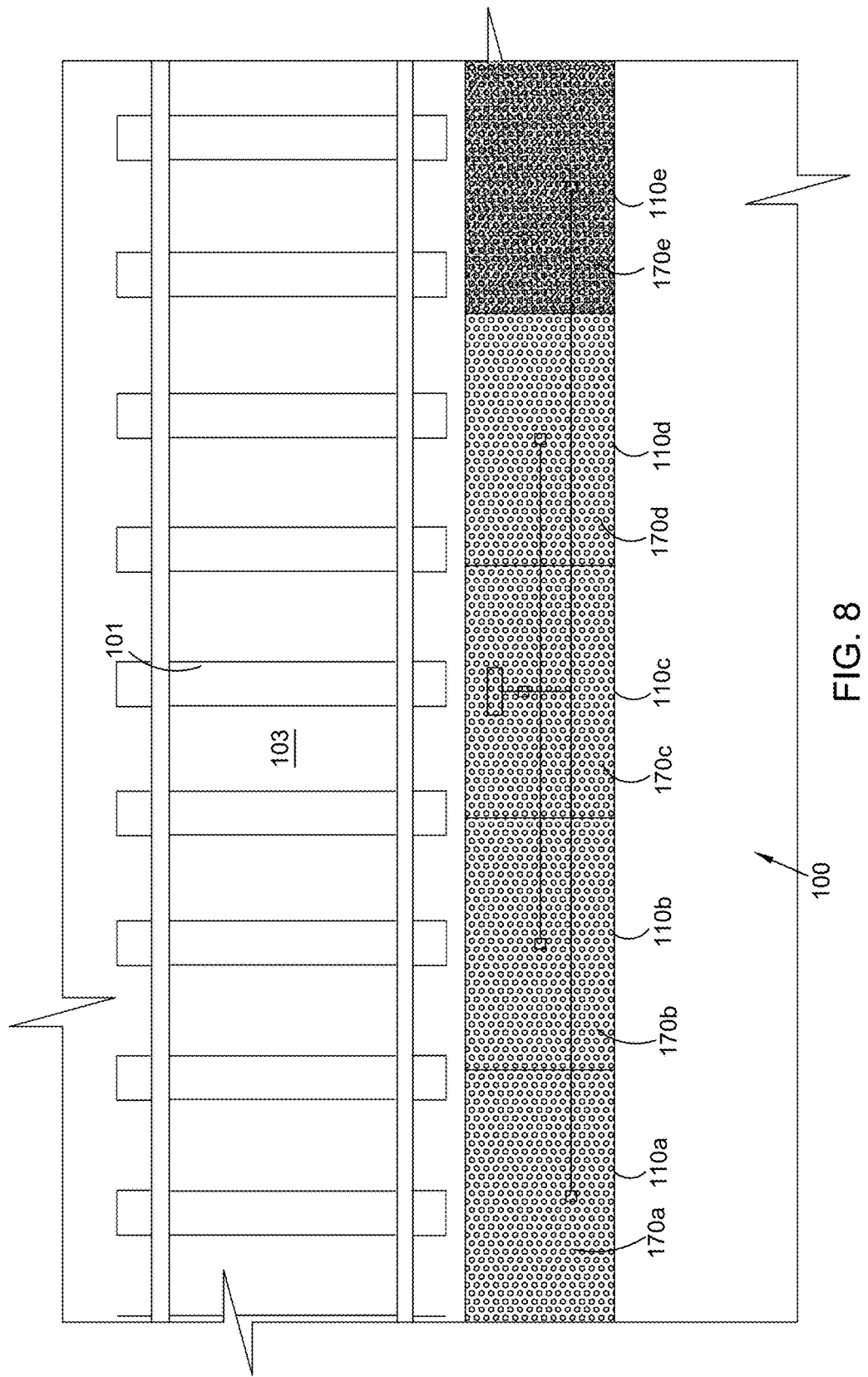
FIG. 8 is a top plan view of the transit platform of FIG. 1, showing the first illustrated embodiment heatable modules in a fifth section of the first illustrated embodiment transit platform being heated during a fifth heating sub-cycle of an overall heating cycle.
Figure 9:
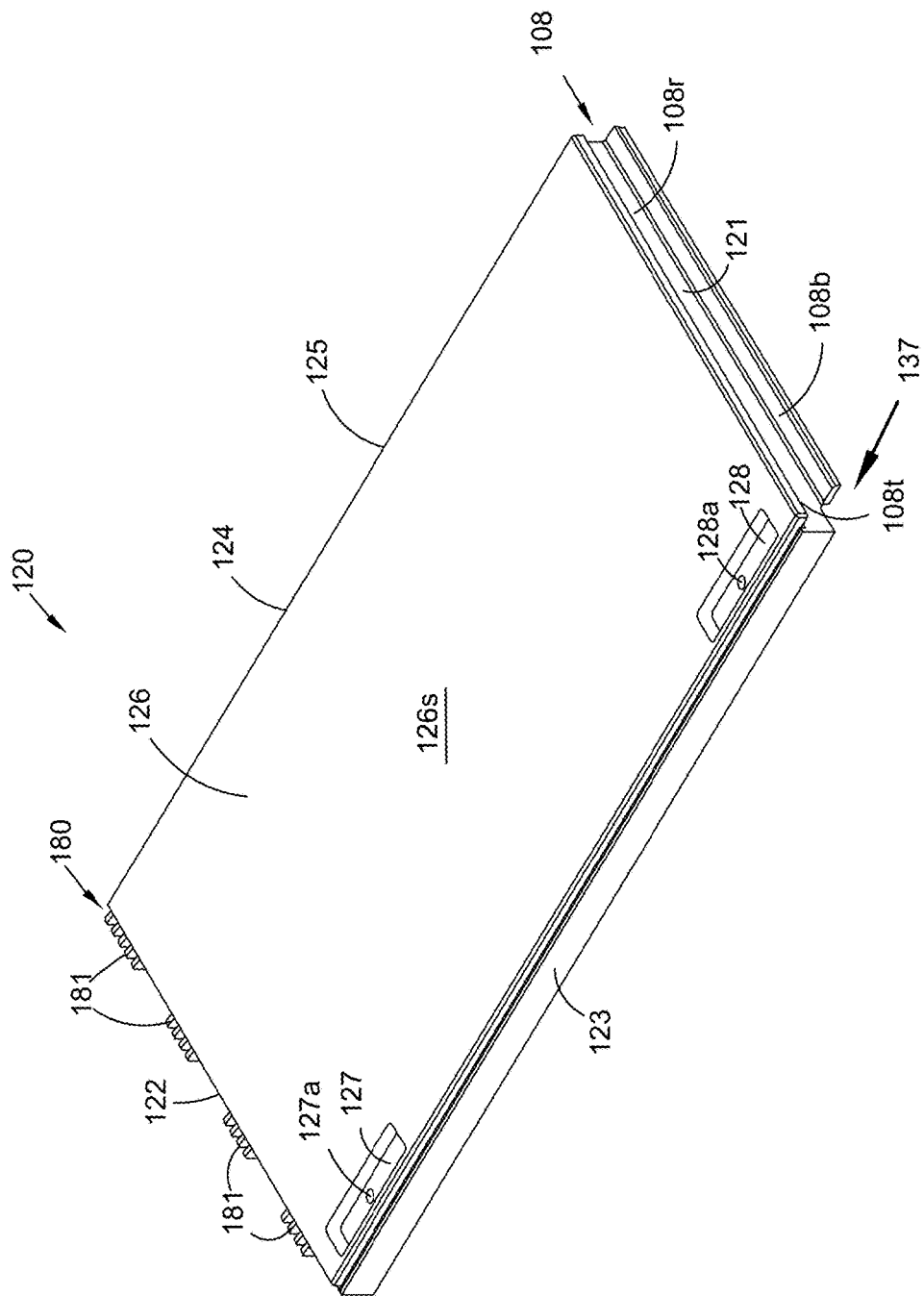
FIG. 9 is a perspective view of the first illustrated embodiment heatable module used in construction of the transit platform of FIG. 1.
Figure 10:
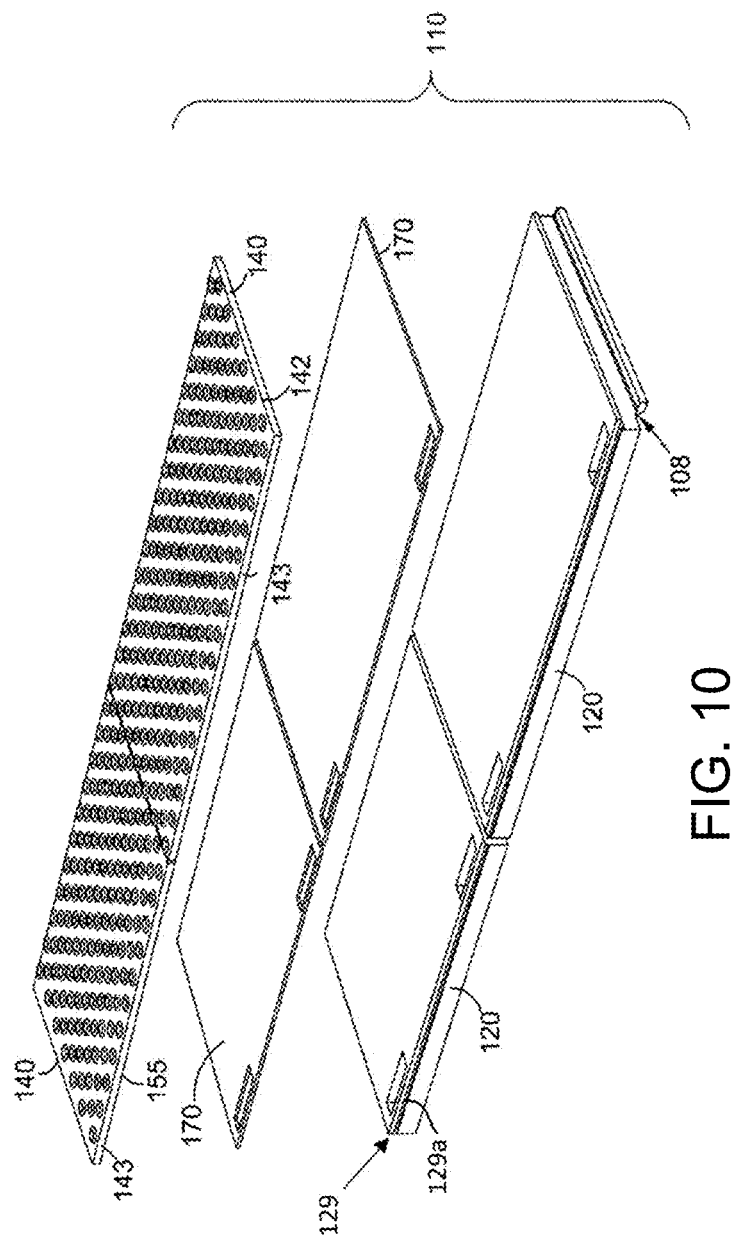
FIG. 10 is an exploded perspective view from above of the first illustrated embodiment heatable module of FIG. 9.
Figure 11:
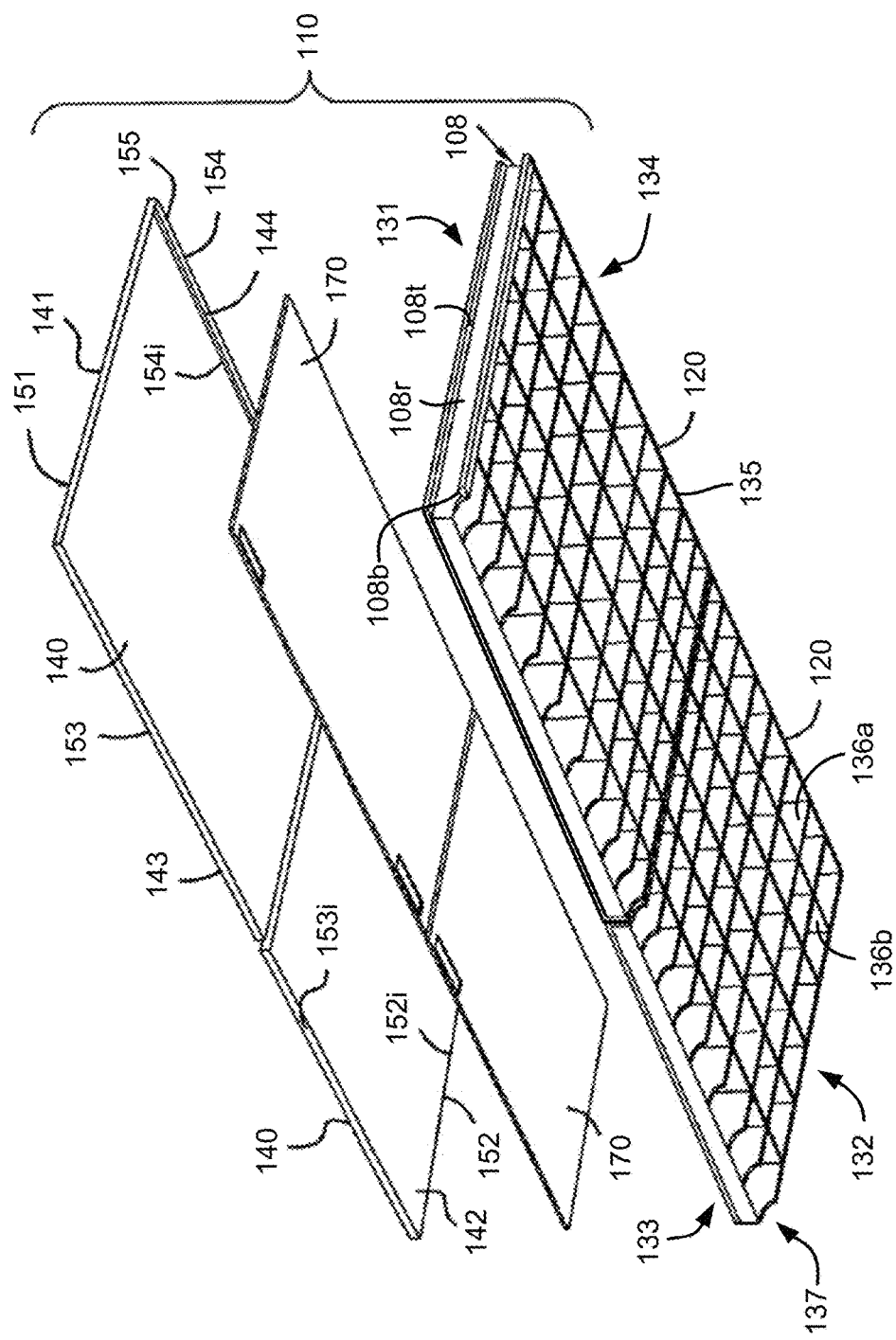
FIG. 11 is an exploded perspective view from below of the first illustrated embodiment heatable module of FIG. 9.
Figure 12:
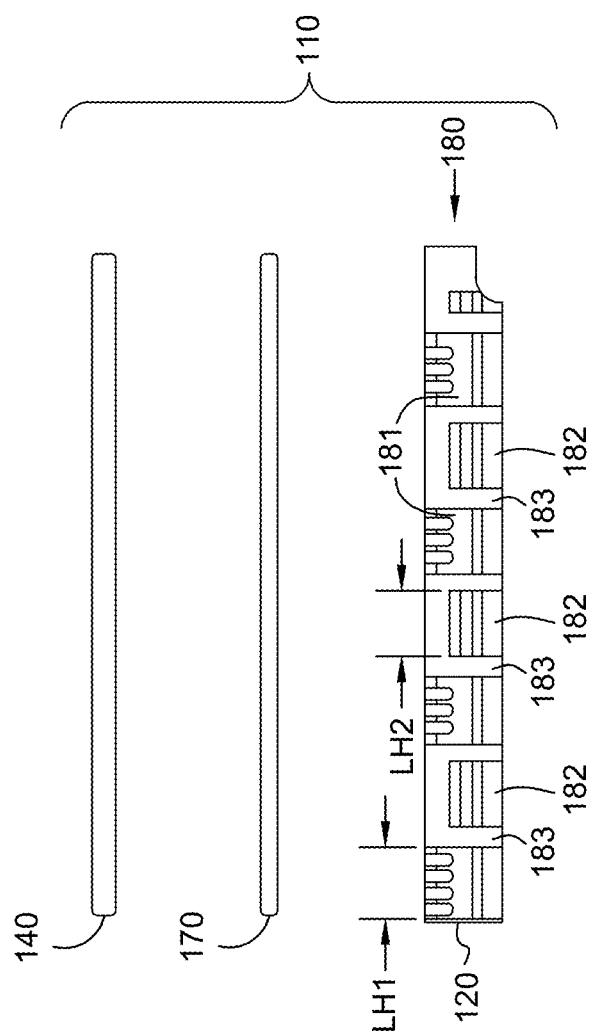
FIG. 12 is an exploded end elevational view of the first illustrated embodiment heatable module of FIG. 9.
Figure 13:
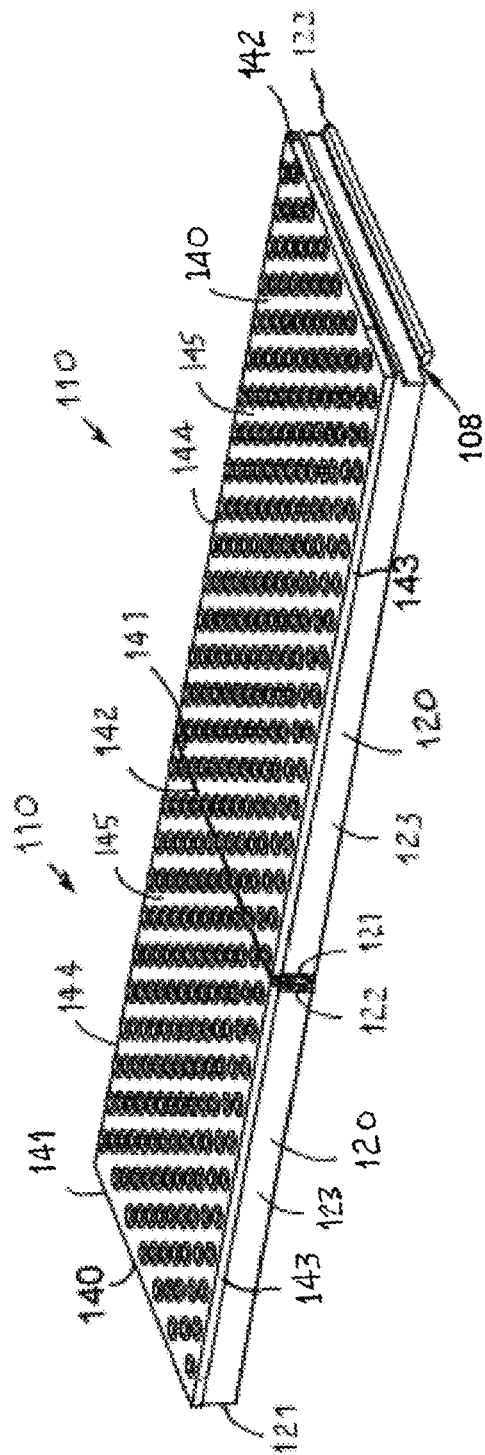
FIG. 13 is a perspective view from above of two of the first illustrated embodiment heatable modules of FIG. 9 connected together.
Figure 14:
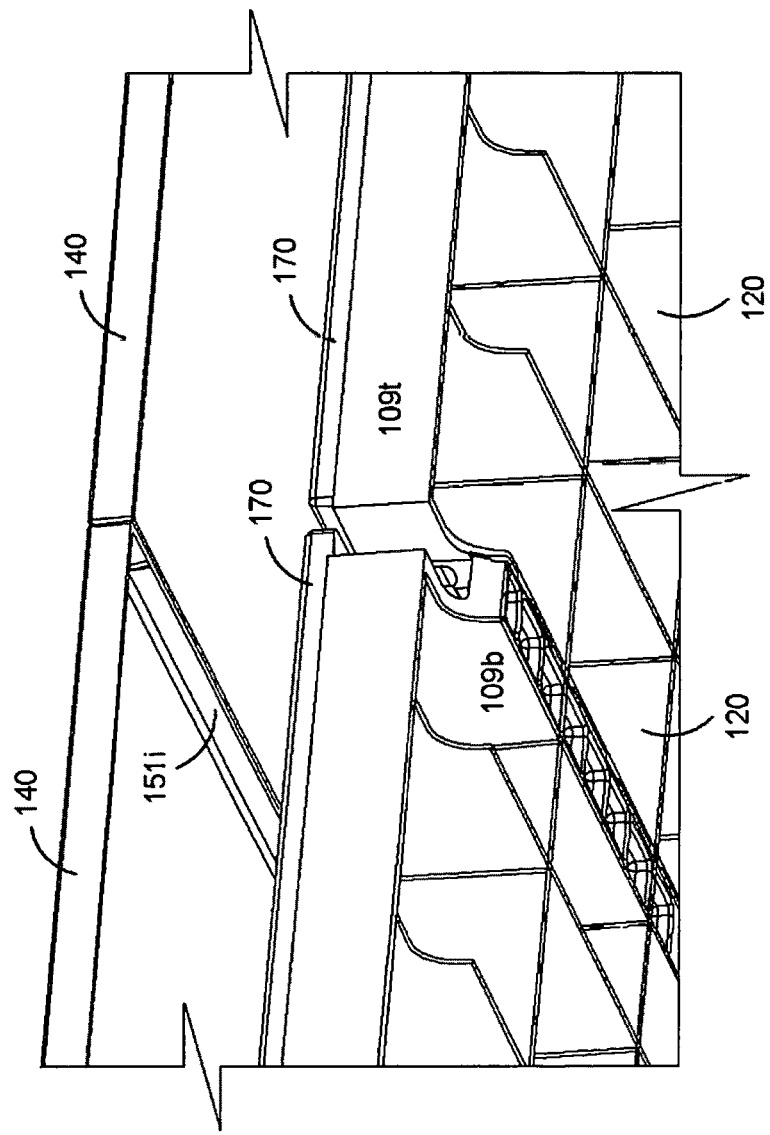
FIG. 14 is a perspective view from below of the tongue structure of the first illustrated embodiment heatable module of FIG. 9.

As can be best seen in FIG. 3, the heatable transit platform 100 comprises a first header wall 102 and a second header wall 104 disposed in parallel spaced relation one to the other, and with aligned bore holes 102a,104a in the first header wall 102 and the second header wall 104, respectively. An elongate threaded securing rod 107 extends through the first header wall 102, the modular panel 110, and the second header wall 104, as will be discussed in greater detail subsequently. In general, the modular panels 110 are each installed in place to form the transit platform 100. The modular panels 110 may be installed in connected relation one to the next, or may be installed apart from one another, to form separate but related sections or areas of an overall transit platform. In the illustrated embodiment, the modular panels 110 are placed in first-end to second-end relation and are placed in first-side to second-side relation between the first header wall 102 and a second header wall 104 such that the first side walls 133 of the modular panels 110 face the first header wall 102 and the second side walls 134 of the modular panels 110 face the second header wall 104.

More specifically, in the first illustrated embodiment of the present invention the heatable pathway system for traffic 100 comprises plurality of a heatable module 110a-110e, as indicated by the general reference numeral 110, for use in constructing the first illustrated embodiment heatable pathway system for traffic 100, such as a heatable transit platform 100, adjacent a railroad track 101. More specifically, the first illustrated embodiment heatable module 110 comprises a heatable modular panel 110 that is rectangular in shape, and is typically greater than one meter in length and less than one meter in width, and perhaps about 7.5 centimeters (3 inches) in height. It has been found that this size and shape is suitable for the intended applications. It should be understood that the heatable modular panel 110 can be of any suitable shape and size. Even more specifically, the present invention comprises a first heatable module 100a, a second heatable module 100b, a third heatable module 100c, a fourth heatable module 100d, a fifth heatable module 100e, and an electrical controller circuit 190.

Further, the heatable transit platform 100 comprises a first modular panel 110a with a first electrically powered heater member 170a, a second modular panel 110b with a second electrically powered heater member 170b, a third modular panel 110c with a third electrically powered heater member 170c, a fourth modular panel 110d with a fourth electrically powered heater member 170d, and a fifth modular panel 110e with a fifth electrically powered heater member 170e.

As illustrated, the module 110, and more specifically the modular panel 110, comprises a base member 120 for engaging the ground on which the modular panel 110 rests, a top plate 140 that is positioned generally over the base member 120, and an optional electrically powerable heater member 170 disposed between the top plate 140 and the base member 120, a threaded securing rod 107, a lateral groove 108 and a tongue structure 180, as will be discussed in greater detail subsequently.

Each base member 120 has a first end 121, a second end 122, a first side 123 and a second side 124, a perimeter edge 125, a top deck 126, and a top surface 126s. The top deck 126 extends between the first end 121, the second end 122, the first side 123 and the second side 124 of the base member 120, and preferably is generally continuous across the top of the base member 120. The top deck 126 of the base member 120 has a first recessed pocket 127 and a second recessed pocket 128 for accommodating electrical connectors and electrical wires therein. The first recessed pocket 127 has a wire-receiving aperture 127a therein and the second recessed pocket 128 has a wire-receiving aperture 128a therein for receiving electrical wires therethrough.

The base member 120 also has a first end wall 131 depending from the top deck 126 at the first end 121 thereof, a second end wall 132 depending from the top deck 126 at the second end 122 thereof, a first side wall 133 depending from the top deck 126 at the first side 123 thereof, and a second side wall 134 depending from the top deck 126 at the second side 124 thereof. The first end wall 131, the second end wall 132, the first side wall 133 and the second side wall 134 each terminate in a bottom edge that together form the bottom peripheral edge 135 of the base member 120. Preferably, and in the first illustrated embodiment, the portion of the bottom peripheral edge 135 of the base member 120 defined by the second side wall 134, most of the first end wall 131 and most of the second end wall 132 is substantially planar in order to properly engage a receiving surface, such as a compacted gravel surface, or the like. The first end wall 131, the second end wall 132, the first side wall 133 and the second side wall 134 are each interconnected one to the next to help form a solid stable structure.

The base member 120 further comprises a plurality of internal cross support members 136 depending from the top plate 140. The internal cross support members 136 depend from the top deck 126 and extend to the bottom edge 135 of the base member 120, and comprise a plurality of lateral ribs 136a and a plurality of longitudinal ribs 136b. As can readily be seen in the Figures, the lateral ribs 136a each extend between the first side wall 133 and the second side wall 134 and are spaced generally evenly apart one from the next along the length "LB" of the base member 120, between the first end wall 131 and the second end wall 132 of the base member 120. Similarly, the longitudinal ribs 136b each extend between the first end wall 131 and the second end wall 132 and are spaced generally evenly apart one from the next along the width "WB" of the base member 120, between the first side wall 133 and the second side wall 134 of the base member 120.

The base member 120 also has a longitudinal raceway 137 in the bottom thereof, along the first side of the base member 120, for receiving electrical wires therein. In order to form the raceway 137, the bottom edge 135a of the first side wall 133 is slightly higher up than the bottom edge 135 of the second end wall 132 and the bottom edge 135 of the first end wall 131 and the bottom edge 135 of the of the second side wall 134. The longitudinal raceway 137 preferably extends from the first end wall 131 to the second end wall 132. In this manner, electrical wires can run from one heatable modular panel 110 to the next, as will be described in greater detail subsequently.

The base member 120, and more specifically the first end wall 131 of the base member 120, defines the lateral groove 108 disposed at the perimeter edge 125, and that, in the first illustrated embodiment, but not necessarily, extends the entire width "WB" of the base member 120. The groove 108 is defined by a top surface 108t, a recessed surface 108r and a bottom surface 108b. The top surface 108t and the recessed surface 108r are connected together by a top concave curved surface 109t. Similarly, the bottom surface 108b and the recessed surface 108r are connected together by a bottom concave curved surface 109b. The ratio of the height of the lateral groove 108 to the height of the base member 120 is between about 0.5:1 and 0.6:1.

The base member 120, and more specifically the second end wall 132 of the base member 120, defines the tongue structure 180 disposed at the perimeter edge 125. The tongue structure 180 is shaped and dimensioned to be received in the lateral groove 108. More specifically, the tongue structure 180 of a first module is shaped and dimensioned to be received in the lateral groove 108 of a second module. To form the transit platform 100, the modular panels 110 are placed in perimeter-edge to perimeter-edge relation one to the next, and more specifically in first-end to second-end relation, and are secured together one to the next, with the tongue structure 180 of each heatable modular panel 110 inserted into the lateral groove 108 of an adjacent modular panel 110.

The tongue structure 180 defines a throughpassage 189 for receiving a threaded securing rod 107 therethrough. The throughpassage 189 in the tongue structure 180 is closer to the bottom peripheral edge 135 of the base member 120 than to the top deck 126 of the base member 120 so that there is sufficient structural strength of material above any bore holes, such as bore holes 102a, 104a, so as to preclude failure of that portion of the first or second header walls 102, 104.

In the first illustrated embodiment, the tongue structure 180 comprises a plurality of tongue portions 181,182 that each project outwardly from the second end wall 132 of the base member 120. The tongue portions 181,182 comprises a first type of tongue portion 181 and a second type of tongue portion 182. The first type of tongue portion 181 and a second type of tongue portion 182 are disposed in alternating relation generally along the length of the tongue structure 180, with horizontal gaps 183 therebetween. Generally along the length of the tongue structure 180, the first type of tongue portions are shaped in a first radius at the top outer surface thereof.

As can be best seen in FIGS. 9 through 12, the heatable modular panel 110 also comprises a top plate 140 having a first end 141, a second end 142, a first side 143 and a second side 144, a top surface 145 and a bottom surface 146. The top surface 145 of the top plate 140 is preferably a detectable warning surface. More specifically, the top plate 140 comprises a plurality of horizontally spaced button structures 160 projecting upwardly therefrom that together form the detectable warning surface. The button structures 160 include both solid button structures 160a integrally formed with the top plate 140 and fastener-receiving button structures 160b, as will be discussed in greater detail subsequently. Typically in use, these horizontally spaced button structures 160 are highly visible to sighted persons, and even more importantly, are engageable by walking canes, and the like of visually impaired persons, in order to provide a warning of the edge of a pedestrian walkway such as the transit platform 100. The button structures 160 will be discussed in greater detail subsequently.

The top plate 140 also has a first end flange 151 depending from the top plate 140 at the first end 141 thereof, a second end flange 152 depending from the top plate 140 at the second end 142 thereof, a first side flange 153 depending from the top plate 140 at the first side 143 thereof, a second side flange 154 depending from the top plate 140 at the second side 144 thereof.

The first end flange 151, the second end flange 152, the first side flange 153 and the second side flange 154 each terminate in a bottom edge that together form the bottom peripheral edge 155 of the top plate 140. In a co-operating manner, the base member 120 has a peripheral recess 129 at the top thereof for receiving at least the bottom portions of the first side flange 153, the second side flange 154, the first end flange 151, and the second end flange 152. The top plate 140 is thereby engageable with the top deck 126 of the base member 120. Preferably, and in the first illustrated embodiment, the bottom peripheral edge 155 of the top plate 140 is substantially planar in order to properly engage the base member 120.

The heatable modular panel 110 further comprises a gasket 156 disposed in sealing relation between the horizontally outwardly facing surface 129a of the peripheral recess 129 and the horizontally inwardly facing surfaces 151i, 152i, 153i, 154i of the first end flange 151, the second end flange 152, the first side flange 153, and the second side flange 154. The gasket 156 is preferably continuous around the entire peripheral recess 129 at the top of the base member 120 in order to provide a waterproof seal between the top plate 140 and the base member 120.

The top plate 140 is in removable and replaceable relation to the base member 120, specifically to the top deck 126 of the base member 120, once in place, by means of a plurality of threaded fasteners 159. Each fastener 159 extends through a fastener-receiving aperture 161 in a fastener-receiving button structure 160b and engages in securing relation the top deck 126 of the base member 120. As can be readily understood, the top plate 140 can be easily and quickly removed and replaced, desired.

For any threaded fasters 159 that extend through the heater member 170, and aperture (not specifically shown) is punched in the heater member 170 in order to accommodate threaded fastener 159. Insulating tape (not specifically shown) is used to ensure a waterproof connection.

As discussed previously, the top plate 140 comprises a plurality of horizontally spaced button structures 160 projecting upwardly therefrom. The button structures 160 comprise both solid button structures 160a integrally formed with the top plate 140 and fastener-receiving button structures 160b. The fastener-receiving button structures 160b comprise an upwardly projecting peripheral portion 162 and a depressed central portion 163 that are both integrally formed with the top plate 140. The fastener-receiving aperture 161 is disposed within the depressed central portion 163 and is surrounded by the depressed central portion 163. A grommet 159a receives the threaded fastener 159 and seats into the depressed central portion 163.

The fastener-receiving button structure 160b further comprises a cap member 164 securable in removable and replaceable relation within the depressed central portion 163 of the fastener-receiving button structures 160b. The cap member 164 has at least one key 164a, and preferably a plurality of keys 164a. Correspondingly, the each of the fastener-receiving button structures 160b has at least one keyway 164b therein, and preferably the same number of keyways 164b as keys 164a. The keyways are preferably, but not necessarily, in the top plate 140 between the depressed central portion 163 and the upwardly projecting peripheral portion 162. The keys 164a are received in cooperating keyways 164b in the top plate 140. The keys 164a and the keyways 164b together rotationally align the cap member 164 such that the traction-providing protrusions on its top surface align with the traction-providing protrusions on the top surface of the top plate 140.

As can be readily seen in the Figures, the solid button structures 160a have a textured top surface 160t, and the cap members 164 of the fastener-receiving button structures 160b have a textured top surface 165. The texture top surfaces 160t and 165 provide for excellent traction for pedestrians walking on the top plates 140.

As also can readily be seen in the Figures, that the top plate 140 is securable in overlying relation to the top surface 126s of the base member 120, or in other words to the top deck 126 of the base member 120, with a heater-receiving space 149 therebetween. The heatable modular panel 110 also has an electrically powered heater member 170 disposed within the heater-receiving space 149 between the base member 120 and the top plate 140. In the first illustrated embodiment, the electrically powered heater member 170 comprises a thin sheet type electrically powered heater member 170. As illustrated, the electrically powered heater member 170 is disposed against the bottom surface 146 of the top plate 140, so is the maximize the heat transfer thereto. Further, the electrically powered heater member 170 is secured to the bottom surface 146 of the top plate 140, and preferably is secured to the bottom surface 146 of the top plate 140 by a suitable adhesive 171.

The top plate 140 preferably comprises any suitable polymer plastic material or Fibre-Glass™ type material, and preferably includes a heat conductive polymer material 147 and a heat retentive polymer material 148. The heat conductive polymer material 147 allows for quick conduction of heat from the heater member 170 through the top plate 140 and to the top surface 145 of the top plate 140, in order to permit quick melting of snow and ice. The heat retentive polymer material 148 serves to retain heat within the heater member 170 once the electrical power to the heater member 170 has been turned off, thereby allowing for a longer cycle time until electrical power needs to be applied again to retain sufficient heat to melt snow and ice. It is also possible to include small stones, or the like, in the polymer material in order to preclude wearing of the top plate 140. It should be noted that small stones, or the like, cannot be included if the top plate 140 is formed via a compression molding method where the resin is pumped into the mold. It should also be noted that typically, fillers such as the heat conductive polymer material 147 and the heat retentive polymer material 148 degrade the UV resistance of the resin used to form the top plate 140. Accordingly, a UV resistant coating can be sprayed on top of the top plate 140.

Further, a suitable type of insulation (not specifically shown in this embodiment, but shown in another embodiment), such as pre-molded insulation or foamed insulation, can be used to fill the open spaces of the base member 120, between the various internal cross support members 136. As can be readily understood, the insulation precludes heat from the heater member 170 from escaping downwardly through the base member 120, thereby allowing for more efficient heating of the top plate 140. The insulation can be either a low density type of foam or a high density type of foam such as a structural foam to provide additional structural support. Further, a ceramic layer (not specifically shown), can be placed between the top plate 140 and the base member 120.

In order to form the transit platform 100, the base members 120 of the modular panels 110 are placed in perimeter-edge to perimeter-edge relation one to the next, and more specifically in first-end to second-end relation, and are secured together one to the next. The heater members 170 are then placed over the top decks 126 of the base members 120, and the top plates 140 are placed over the heater members 170 and onto the top decks 126 of the base members 120. The top plates 140 and the heater members 170 are secured in place via the threaded fasteners 159 extending through said fastener-receiving apertures 161 of the top plates and securely engaged in the base members 120.

More specifically, the base member 120 of a first heatable modular panel 110 is set in place on a receiving surface, such as a compacted gravel surface, or the like. The base member 120 of a second heatable modular panel 110 is placed in first-end to second-end relation with base member 120 of the first heatable modular panel 110 by inserting the tongue structure 180 of the base member 120 of the second heatable modular panel 110 into the groove 108 of the base member 120 of the first heatable modular panel 110. The base member 120 of a third heatable modular panel 110 is placed in first-end to second-end relation with the base member 120 of the second heatable modular panel 110 by inserting the tongue structure 180 of the base member 120 of the third heatable modular panel 110 into the groove 108 of the base member 120 of the second heatable modular panel 110. This process is completed until a lengthwise row of the necessary number of base members 120 are in place.

Alternatively, the base members 120 of the heatable modular panels 110 could be joined together the opposite other way around by setting the base member 120 of a first heatable modular panel 110 in place on a receiving surface, and introducing the base member 120 of the second heatable modular panel 110 over the tongue structure 180 of the base member 120 of the first heatable modular panel 110 such that the tongue structure 180 of the base member 120 of the first heatable modular panel 110 is received in the groove 108 of the base member 120 of the second heatable modular panel 110.

Similarly, base members 120 are placed in perimeter-edge to perimeter-edge relation one to the next, and more specifically in first-end to second-end relation immediately beside the lengthwise row of base members 120 in order to form a second lengthwise row of heatable modular panels 110. The tongues of laterally adjacent base members 120 are longitudinally aligned to for a single throughpassage 189 for receiving an elongate threaded securing rod therethrough. The above-described process is repeated until all of the necessary base members 120 are in place. For the present transit platform 100, the lengthwise rows of heatable modular panels 110 are closely fit between two parallel timber headers 102, 104 that form the first header wall 102 and the second header wall 104 of the transit platform 100. The first header wall 102 and a second header wall 104 are disposed in parallel spaced relation one to the other, and with aligned bore holes 102a, 104a in the first header wall 102 and the second header wall 104. It should be noted that the first header wall 102 and the second header wall 104 can be made of any other suitable material, or materials, such as concrete.

The threaded securing rod 107 is inserted in place in the transit platform 100 as follows. A first metal plate 105 having an aperture 105a is placed against the outer face of the first header wall 102 with the aperture 105a aligned with the aperture 102a in the first header wall 102. Similarly, a second metal plate 106 having an aperture 106a is placed against the outer face of the second header wall 104 with the aperture 106a aligned with the aperture 104a in the second header wall 104. The threaded securing rod 107 is inserted through the aperture 105a in the first metal plate 105, through the bore hole 102a in the first timber header 102, is then inserted through the throughpassage 189 defined by the aligned tongue structures 180, and through the bore hole 104a in the second timber header 104, and through the aperture 106a in the second metal plate 106. Co-operating threaded nuts 102b, 104b are then put in place onto the threaded securing rod 107 at each end thereof to engage against the first metal plate 105 and the second metal plate 106. The co-operating threaded nuts 102b, 104b are then appropriately tightened. Alternatively, the first metal plate 105 and the second metal plate 106 could each be an "L"-bracket of similar that secures to the ground 103 on which the modular panels 110 rest.

For two interconnected modular panels 110, the threaded securing rod 107 substantially precludes the tongue structure 180 of one modular panel 110 and the lateral groove 108 of the other modular panel 110 from shifting vertically with respect to each other. The threaded securing rod 107 substantially precludes the two interconnected modular panels 110 from shifting with respect to the first header wall 102 and a second header wall 104.

For the entire heatable transit platform 100, there is a plurality of threaded securing rods 107, with each threaded securing rod inserted through an aligned pair of said bore holes 102a, 104a in the first header wall 102 and a second header wall 104, respectively, though the aperture 105a, 106a in the first metal plate 105 and the second metal plate 106, respectively, and through the aligned throughpassage 189 of the modular panel 110. In the event that there are side-by-side ones of the modular panels 110, the overall structure is secured in fundamentally the same manner, except that the threaded securing rods 107 extend through the aligned throughpassages 189 of side-by-side modular panels 110.

In general, the modular panels 110 are placed in first-end to second-end relation and are placed in first-side to second-side relation between the first header wall 102 and a second header wall 104 such that the first side walls 133 of the modular panels 110 face the first header wall 102 and the second side walls 134 of the modular panels 110 face the second header wall 104.

During the placement of the heatable modular panels 110, the electrical wires that will provide power to the heater members 170 are placed so as to be received by the longitudinal raceway 137 in each base member 120. The electrical wires can run from one heatable modular panel 110 to the next as the base members 120 are put in place. The electrical connectors and electrical wires are accommodated in the first recessed pocket 127 and the second recessed pocket 128 in the top deck 126 of the base member 120, where the connectors of each are located.

It should be noted that having rows of the heatable modular panels 110, or even unheatable modular panels, all the way across and no asphalt, is better for constructability purposes because the heatable pathway system for traffic 100 can be constructed during poor weather conditions, thereby minimizing construction delays, and also constructed much more quickly on an overall basis, and at a lower cost that if asphalt areas are included.

As can be best seen in FIGS. 4 through 8, the electrical power controller circuit 190 has a first power output 191a, a second power output 191b, a third power output 191c, a fourth power output 191d, and a fifth power output 191e. Each of the power outputs 191 is connectable in electrical power supplying relation to at least one of a plurality of the electrically powered heater members 170.

More specifically, the first power output 191a connected in power supplying relation to the first electrically powered heater member 170a, the second power output 191b connected in power supplying relation to the second electrically powered heater member 170b, the third power output 191c connected in power supplying relation to the third electrically powered heater member 170c, the fourth power output 191d connected in power supplying relation to the fourth electrically powered heater member 170d, and the fifth power output 191e connected in power supplying relation to the fifth electrically powered heater member 170e.

The electrical power controller circuit 190 is operable to provide electrical power from the power outputs 191a,191b, 191c,191d,191e in a heating cycle that comprises a first heating sub-cycle, a second heating sub-cycle, a third heating sub-cycle, a forth heating sub-cycle, and a fifth heating sub-cycle.

During a heating cycle, the first electrically powered heater member 170a is on and the second electrically powered heater member 170b, the third electrically powered heater member 170c, the fourth electrically powered heater member 170d and the fifth electrically powered heater member 170e are off during the first heating sub-cycle. Also, the second electrically powered heater member 170b is on and the first electrically powered heater member 170a, the third electrically powered heater member 170c, the fourth electrically powered heater member 170d and the fifth electrically powered heater member 170e are off during the second heating sub-cycle. Further, the third electrically powered heater member 170c is on and the first electrically powered heater member 170a, the second electrically powered heater member 170b, the fourth electrically powered heater member 170d and the fifth electrically powered heater member 170e are off during the third heating sub-cycle. Further, the fourth electrically powered heater member 170d is on and the first electrically powered heater member 170a, the second electrically powered heater member 170b, the third electrically powered heater member 170c and the fifth electrically powered heater member 170e are off during the fourth heating sub-cycle. Also, the fifth electrically powered heater member 170e is on and the first electrically powered heater member 170a, the second electrically powered heater member 170b, the third electrically powered heater member 170c and the fourth electrically powered heater member 170d are off during the fifth heating sub-cycle.

In yet another aspect, the present invention comprises a method of heating the pathway for traffic 100, specifically the transit platform 100, having the first modular panel 110a with the first electrically powered heater member 170a, the second modular panel 110b with the second electrically powered heater member 170b, the third modular panel 110c with the third electrically powered heater member 170c, the fourth modular panel 110d with the fourth electrically powered heater member 170d, and the fifth modular panel 110e with the fifth electrically powered heater member 170e.

The method comprising the steps of connecting the first power output 191a of the electrical power controller circuit 190 in power supplying relation to the first electrically powered heater member 170a, connecting the second power output 191b of the electrical power controller circuit 190 in power supplying relation to the second electrically powered heater member 170b, connecting the third power output 191c of the electrical power controller circuit 190 in power supplying relation to the third electrically powered heater member 170c, connecting the fourth power output 191d of the electrical power controller circuit 190 in power supplying relation to the fourth electrically powered heater member 170d, and connecting the fifth power output 191e of the electrical power controller circuit 190 in power supplying relation to the fifth electrically powered heater member 170e.

The method further comprises the steps of operating the electrical power controller circuit 190 to provide electrical power from the first power output 191a, the second power output 191b, the third power output 191c, the fourth power output 191d, and the fifth power output 191e, in a heating cycle that comprises the first heating sub-cycle, the second heating sub-cycle, the third heating sub-cycle, the fourth heating sub-cycle, and the fifth heating sub-cycle.

According to this method, and as stated previously, during a heating cycle, the first electrically powered heater member 170a is on and the second electrically powered heater member 170b, the third electrically powered heater member 170c, the fourth electrically powered heater member 170d and the fifth electrically powered heater member 170e are off during the first heating sub-cycle. Also, the second electrically powered heater member 170b is on and the first electrically powered heater member 170a, the third electrically powered heater member 170c, the fourth electrically powered heater member 170d and the fifth electrically powered heater member 170e are off during the second heating sub-cycle. Further, the third electrically powered heater member 170c is on and the first electrically powered heater member 170a, the second electrically powered heater member 170b, the fourth electrically powered heater member 170d and the fifth electrically powered heater member 170e are off during the third heating sub-cycle. Further, the fourth electrically powered heater member 170d is on and the first electrically powered heater member 170a, the second electrically powered heater member 170b, the third electrically powered heater member 170c and the fifth electrically powered heater member 170e are off during the fourth heating sub-cycle. Also, the fifth electrically powered heater member 170e is on and the first electrically powered heater member 170a, the second electrically powered heater member 170b, the third electrically powered heater member 170c and the fourth electrically powered heater member 170d are off during the fifth heating sub-cycle.

In the first illustrated embodiment, a first one of the heating cycles is longer than subsequent ones of the heating cycles. The longer first heating cycle is typically required to initially heat the heater members 170 and the top plates 140 from a sub-freezing or near freezing temperature. Subsequently, the top plates 140 typically retain residual heat, and accordingly, the subsequent heating cycles can be shorter.

Reference will now be made to FIG. 15, which shows a second illustrated embodiment of the heatable modular panel according to the present invention, as indicated by the general reference numeral 210. The second illustrated embodiment heatable modular panel 210 is similar to the first illustrated embodiment heatable modular panel 100, except that the electrically powered heater member 270 is disposed within the top plate 240. There is no heater member between the top plate 240 and the base member 220. Further, the electrically powered heater member 270 is a mesh type heater member, and the top plate 240 comprises a glass fiber type material 242. The glass fiber type material 242 and the mesh type electrically powered heater member 270 securely inter-engage each other to preclude separation of the glass fiber type material 252 and the mesh type heater member 272 one from the other. An advantage of the second illustrated embodiment heatable modular panel 210 is that heat migrates to the top surface 245 of the top plate 240 very quickly.

Reference will now be made to FIG. 16, which shows a third illustrated embodiment of the heatable modular panel according to the present invention, as indicated by the general reference numeral 310. The third illustrated embodiment heatable modular panel 310 is similar to the first illustrated embodiment heatable modular panel 110 and the second illustrated embodiment heatable modular panel 210, except that the electrically powered heater member 370 is disposed within the top deck 326 for the base member 320. There is no heater member between the top plate 340 and the base member 320. Further, the electrically powered heater member 370 is a mesh type heater member, and the top deck 326 comprises a glass fiber type material 342. The glass fiber type material 342 and the mesh type electrically powered heater member 370 securely inter-engage each other to preclude separation of the glass fiber type material 352 and the mesh type heater member 372 one from the other. An advantage of the third illustrated embodiment heatable modular panel 310 is that the top plate 340 is less expensive than in the second illustrated embodiment heatable modular panel 210, similarly to the first illustrated embodiment heatable modular panel 110.

Reference will now be made to FIG. 17, which shows a fourth illustrated embodiment of the heatable module according to the present invention, as indicated by the general reference numeral 410. The fourth illustrated embodiment heatable module 410 is similar to the first illustrated embodiment heatable module 110, except that there is also a heat control layer 472 disposed between the heater member 470 and the top plate 440. The heat control layer 472 can include any or all of a heat conductive material, a heat retentive material, and a heat reflective material. The heat conductive material would allow for quick conduction of heat from the heater member 470 through to the top surface 445 of the top plate 440 in order to permit quick melting of snow and ice, and also would allow for even distribution of the heat. The heat retentive material would allow a portion of the heat from the heater member 470 to be retained within the heatable module 410 for a period of time after the electrical power to the heater member 470 is turned off, thereby allowing for a longer cycle time until electrical power needs to be applied again to retain sufficient heat to melt snow and ice. The heat reflective material would allow for control of the spread of the heat flow in the heatable module 410.

Further, there is a heat reflective layer 474 disposed between the heater member 470 and the base member 420. The heat reflective layer 474 precludes loss of heat the ground below the base member 420 of the heatable module 410.

Reference will now be made to FIG. 18, which shows a fifth illustrated embodiment of the heatable module according to the present invention, as indicated by the general reference numeral 510. The fifth illustrated embodiment heatable module 510 is similar to the first illustrated embodiment heatable module 110, except that there a suitable type of insulation 529, such as pre-molded insulation or foamed insulation, generally filling the open spaces of the base member 520, disposed between the various internal cross support members 536 and the walls 531,532,533, and 534. As can be readily understood, the insulation 529 precludes heat from the heater member (not specifically shown in this embodiment) from escaping downwardly through the base member 520, thereby allowing for more efficient heating of the top plate (not specifically shown in this embodiment). The insulation 529 can be either a low density type of foam or a high density type of foam such as a structural foam to provide additional structural support.

In the manufacture of the present invention, it is possible to use at least two methods of compression molding to form the base member 120, 220, 320, 420, 520 and the top plate 140, 240, 340, 440, 540. The first method is referred to as sheet molded compound (SMC) wherein a resin is pumped into a mold. Any "parts" inside must be stationary and in the proper place. The second method is referred to as wet compression molding. In the second and third illustrated embodiments, the mesh type electrically powerable heater member 270, 370 is placed in a mold with fiberglass fabric above it and below it. Resin is poured into the mold over the mesh type electrically powerable heater member 270, 370 and fiberglass fabric. The mold is then compressed until the resin is set. It should be noted that with what compression molding, small stones or the like can be included in the resident in order to make the top plate 140, 240, 340, 440, 540 more resistant to wear. It should also be noted that with either of these two methods of manufacture as discussed above, it is believed that the manufacturing cycle time for making a top plate 140, 240, 340, 440, 540 or a base member 120, 220, 320, 420, 520 can be about two to three minutes in length, or even less, which is a significant improvement over the prior art.

As can be understood from the above description and from the accompanying drawings, the present invention provides a heatable pathway system for traffic, such as a heatable transit platform or the like, that uses electrical power efficiently, that is modular, wherein the heatable modules used to construct the heatable pathway system for traffic readily fit properly in place adjacent a wood header of an adjoining platform subgrade that accommodates heatable modules that are about three inches in height, that includes detectable warning indicators, that can include detectable warning tiles, that includes a textured top surface, wherein the included heatable modules are readily connectable one to the next, wherein the included heatable modules are lightweight, wherein the heatable modules are easy to manufacture, wherein the base member of the heatable modules have favourable dielectric properties, wherein heat is transmitted quickly through the top plate above the base member, all of which features are unknown in the prior art.

Other variations of the above principles will be apparent to those who are knowledgeable in the field of the invention, and such variations are considered to be within the scope of the present invention. Further, other modifications and alterations may be used in the design and manufacture of the modular panel, of the present invention, without departing from the spirit and scope of the accompanying claims.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as", "for example") provided herein, is intended merely to better illuminate embodiments of the invention and does not pose a limitation on the scope of the invention unless otherwise claimed. No language in the specification should be construed as indicating any non-claimed element as essential to the practice of the invention.

Illustrated embodiments of this invention are described herein. Variations of those illustrated embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A heatable pathway system for traffic comprising:
a first module having a first electrically powerable heater member and a second module having a second electrically powerable heater member, wherein said first module and said second module are made of plastic and each installable in place to form a heatable pathway system for traffic; and,
an electrical power controller circuit having a first power output connected in power supplying relation to said first electrically powered heater member and a second power output connected in power supplying relation to said second electrically powerable heater member;
wherein said electrical power controller circuit is operable to provide electrical power from said power outputs in a heating cycle that comprises a first heating sub-cycle and a second heating sub-cycle such that, during a heating cycle, a first one of said electrically powerable heater members is on and a second one of said electrically powerable heater members is off during said first heating sub-cycle, and said second electrically powerable heater member is on and said first electrically powerable heater members is off during said second heating sub-cycle;
wherein each module comprises a top plate that is removably attachable to a base member, and wherein said electrically powerable heater member is disposed between said top plate and said base member; and
wherein the top plate comprises a first end flange extending from a first end thereof and a second end flange extending from a second end thereof, and the base member comprises a peripheral recess at the top thereof for receiving at least the bottom portions of the first end flange and the second end flange.

2. The heatable pathway system for traffic of claim 1, wherein said first module and said second module are placed in perimeter-edge-to-perimeter-edge relation one to the other.

3. The heatable pathway system for traffic of claim 1, wherein each of said power outputs is connectable in electrical power supplying relation to at least one of a plurality of said electrically powerable heater members.

4. The heatable pathway system for traffic of claim 3, wherein said plurality of electrically powerable heater members comprises a third electrically powerable heater member, a fourth electrically powerable heater member, and a fifth electrically powerable heater member.

5. The heatable pathway system for traffic of claim 4, wherein said heating cycle additionally comprises a third heating sub-cycle, a fourth heating sub-cycle, and a fifth heating sub-cycle.

6. The heatable pathway system for traffic of claim 5, wherein during a heating cycle, said first electrically powerable heater member is on and said second electrically powerable heater member, said third electrically powerable heater member, said fourth electrically powerable heater member and said fifth electrically powerable heater member are off during said first heating sub-cycle.

7. The heatable pathway system for traffic of claim 5, wherein said second electrically powerable heater member is on and said first electrically powerable heater member, said third electrically powerable heater member, said fourth electrically powerable heater member and said fifth electrically powerable heater member are off during said second heating sub-cycle.

8. The heatable pathway system for traffic of claim 7, wherein said fourth electrically powerable heater member is on and said first electrically powerable heater member, said second electrically powerable heater member, said third electrically powerable heater member and said fifth electrically powerable heater member are off during said fourth heating sub-cycle.

9. The heatable pathway system for traffic of claim 8, wherein said fifth electrically powerable heater member is on and said first electrically powerable heater member, said second electrically powerable heater member, said third electrically powerable heater member and said fourth electrically powerable heater member are off during said fifth heating sub-cycle.

10. The heatable pathway system for traffic of claim 1, wherein said top plate includes a heat conductive polymer material.

11. The heatable pathway system for traffic of claim 1, wherein said top plate includes a heat retentive polymer material.

12. The heatable pathway system of claim 1, further comprising a heat control layer disposed between the heater member and the top plate.

13. The heatable pathway system of claim 12, wherein said heat control layer includes one or more of the following: a heat conductive material, a heat retentive material, and a heat reflective material.

14. The heatable pathway system of claim 13, further comprising a heat reflective layer disposed between the heater member and the base member.

15. The heatable pathway system of claim 1, further comprising an insulation disposed between cross support members and walls of the base member.

16. A method of heating a heatable pathway system for traffic having a first module with a first electrically powerable heater member, and a second module with a second electrically powerable heater member, said method comprising the steps of:
connecting a first power output of an electrical power controller circuit in power supplying relation to said first electrically powerable heater member, and connecting a second power output of an electrical power controller circuit in power supplying relation to said second electrically powerable heater member;

operating said electrical power controller circuit to provide electrical power from said first and second power outputs in a heating cycle that comprises a first heating sub-cycle and a second heating sub-cycle such that, during a heating cycle, a first one of said electrically powerable heater members is on and a second one of said electrically powerable heater members is off during said first heating sub-cycle, and said second electrically powerable heater member is on and said first electrically powerable heater members is off during said second heating sub-cycle;

wherein each module comprises a top plate that is removably attachable to a base member, and wherein said electrically powerable heater member is disposed between said top plate and said base member; and wherein the top plate comprises a first end flange extending from a first end thereof and a second end flange extending from a second end thereof, and the base member comprises a peripheral recess at the top thereof for receiving at least the bottom portions of the first end flange and the second end flange.

17. The method of heating a heatable pathway system for traffic of claim 16, wherein said heating cycle additionally comprises a third heating sub-cycle, a fourth heating sub-cycle, and a fifth heating sub-cycle.

18. The method of heating a heatable pathway system for traffic of claim 16, wherein during a heating cycle, said first electrically powerable heater member is on and said second electrically powerable heater member, said third electrically powerable heater member, said fourth electrically powerable heater member and said fifth electrically powerable heater member are off during said first heating sub-cycle.

19. The method of heating a heatable pathway system for traffic of claim 18, wherein said second electrically powerable heater member is on and said first electrically powerable heater member, said third electrically powerable heater member, said fourth electrically powerable heater member and said fifth electrically powerable heater member are off during said second heating sub-cycle.

20. The method of heating a heatable pathway system for traffic of claim 19, wherein said fourth electrically powerable heater member is on and said first electrically powerable heater member, said second electrically powerable heater member, said third electrically powerable heater member and said fifth electrically powerable heater member are off during said fourth heating sub-cycle.

21. The method of heating a heatable pathway system for traffic of claim 20, wherein said fifth electrically powerable heater member is on and said first electrically powerable heater member, said second electrically powerable heater member, said third electrically powerable heater member and said fourth electrically powerable heater member are off during said fifth heating sub-cycle.

22. The method of heating a heatable pathway system for traffic of claim 16, wherein a first one of said heating cycle is longer than subsequent ones of said heating cycle.

* * * * *